(12) United States Patent
Finnell

(10) Patent No.: US 10,443,569 B1
(45) Date of Patent: Oct. 15, 2019

(54) WIND OR WATER BASED POWER GENERATING SYSTEM

(71) Applicant: Alfred Finnell, Lake Worth, FL (US)

(72) Inventor: Alfred Finnell, Lake Worth, FL (US)

(*) Notice: Subject to any disclaimer, the term of this patent is extended or adjusted under 35 U.S.C. 154(b) by 640 days.

(21) Appl. No.: 14/204,931

(22) Filed: Mar. 11, 2014

Related U.S. Application Data

(63) Continuation-in-part of application No. 12/825,857, filed on Jun. 29, 2010, now Pat. No. 8,668,455, which is a continuation-in-part of application No. 12/496,769, filed on Jul. 2, 2009, now Pat. No. 7,775,760.

(51) Int. Cl.
*F03D 7/02* (2006.01)

(52) U.S. Cl.
CPC .................... *F03D 7/028* (2013.01)

(58) Field of Classification Search
USPC ...................................... 290/44, 55
See application file for complete search history.

(56) References Cited

U.S. PATENT DOCUMENTS

| | | | |
|---|---|---|---|
| 155,472 A | 9/1874 | Smythe | |
| 178,507 A | 6/1876 | Burrows | |
| 243,169 A | 6/1881 | Sprague | |
| 320,273 A | 6/1885 | Munzinger | |
| 425,774 A | 4/1890 | Frost | |
| 726,439 A | 4/1903 | Knapp | |
| 835,667 A | 11/1906 | Donnelly | |
| 853,096 A | 5/1907 | Lewis | |
| 864,597 A | 8/1907 | De Bavay | |
| 1,461,048 A * | 7/1923 | Roman | F03D 7/0224 416/51 |
| 3,902,072 A * | 8/1975 | Quinn | F03D 3/068 290/44 |
| 3,942,839 A * | 3/1976 | Chalk | B60B 1/0207 301/73 |
| 3,974,395 A * | 8/1976 | Bright | F03D 7/0272 290/44 |
| 4,087,927 A * | 5/1978 | Basmajian | G09B 25/02 290/55 |
| 4,146,264 A * | 3/1979 | Korzeniewski | F03D 7/0272 290/44 |

(Continued)

*Primary Examiner* — Pedro J Cuevas
(74) *Attorney, Agent, or Firm* — Allen D Hertz, P.A.; Allen D. Hertz

(57) ABSTRACT

A wind operated electrical power generating system integrating a wind powered turbine with an electric power generator. The generator is capable of outputting a power level that is greater than a power level obtained by the turbine when the system is operating at an operational rotational speed. The power output is optimized by increasing a load upon the generator. The optimization is based upon the rotational speed of the elements of the system. The system adjusts the load applied to the generator as the system meets each of a plurality of predetermined rotational speeds. The load adjustment can be provided by manual or automated intervention. The system can integrated the generator directly within the turbine or remotely. In a remote configuration, a hydraulic pump obtains power from the turbine and transfers the power by flow of hydraulic fluid to a hydraulic motor. The hydraulic motor drives the generator.

20 Claims, 18 Drawing Sheets

(56) References Cited

U.S. PATENT DOCUMENTS

| | | | | |
|---|---|---|---|---|
| 4,256,972 A * | 3/1981 | Wyatt | G01R 29/18 | 307/152 |
| 4,280,061 A * | 7/1981 | Lawson-Tancred | F03D 7/02 | 290/44 |
| 4,289,970 A * | 9/1981 | Deibert | F03D 7/0224 | 290/44 |
| 4,330,714 A * | 5/1982 | Smith | F03D 1/0608 | 290/55 |
| 4,331,881 A * | 5/1982 | Soderholm | F03D 7/0272 | 290/44 |
| 4,340,822 A | 7/1982 | Gregg | | |
| 4,410,806 A * | 10/1983 | Brulle | F03D 7/06 | 290/44 |
| 4,426,192 A * | 1/1984 | Chertok | F03D 7/0224 | 416/1 |
| 4,427,897 A * | 1/1984 | Migliori | F03D 7/0272 | 290/44 |
| 4,461,957 A * | 7/1984 | Jallen | F03D 7/0272 | 290/44 |
| 4,490,093 A * | 12/1984 | Chertok | F03D 7/0224 | 416/152 |
| 4,491,739 A * | 1/1985 | Watson | F03D 13/20 | 290/44 |
| 4,503,673 A * | 3/1985 | Schachle | F03D 7/04 | 290/44 |
| 4,656,413 A * | 4/1987 | Bourbeau | H02P 9/105 | 307/87 |
| 5,798,632 A * | 8/1998 | Muljadi | F03D 7/0272 | 290/44 |
| 5,823,749 A * | 10/1998 | Green | F03D 3/067 | 416/132 B |
| 5,982,116 A * | 11/1999 | Yang | H02P 5/50 | 318/77 |
| 6,064,123 A * | 5/2000 | Gislason | F03D 13/22 | 290/55 |
| 6,957,946 B1 | 10/2005 | Vander Kley | | |
| 7,183,664 B2 * | 2/2007 | McClintic | F03D 7/0236 | 290/44 |
| 7,268,443 B2 * | 9/2007 | Kikuchi | H02P 9/006 | 290/44 |
| 7,436,086 B2 * | 10/2008 | McClintic | F03D 7/0236 | 290/44 |
| 7,615,880 B2 * | 11/2009 | Kikuchi | H02P 9/006 | 290/44 |
| 7,775,760 B1 * | 8/2010 | Finnell | F03D 1/0658 | 415/4.3 |
| 7,863,767 B2 * | 1/2011 | Chapple | F03D 7/02 | 126/247 |
| 7,952,216 B2 * | 5/2011 | Kikuchi | H02P 9/006 | 290/44 |
| 8,174,142 B2 * | 5/2012 | Barber | F03D 1/02 | 290/55 |
| 8,178,987 B2 * | 5/2012 | Mahawili | H02K 7/1869 | 290/44 |
| 8,242,620 B2 * | 8/2012 | Kikuchi | H02P 9/006 | 290/40 C |
| 8,278,773 B2 * | 10/2012 | Murata | F03D 9/003 | 290/44 |
| 8,362,633 B2 * | 1/2013 | Tsutsumi | F03D 9/001 | 290/44 |
| 8,368,236 B2 * | 2/2013 | Ben-David | F03D 7/0272 | 290/8 |
| 8,436,485 B1 * | 5/2013 | Smith | F03D 9/00 | 290/55 |
| 8,464,990 B2 * | 6/2013 | Flores | F03D 13/20 | 248/218.4 |
| 8,466,573 B2 * | 6/2013 | Kikuchi | H02P 9/006 | 290/44 |
| 8,502,402 B2 * | 8/2013 | Hamano | F03D 7/0264 | 290/43 |
| 8,598,731 B2 * | 12/2013 | Pitre | F03D 3/061 | 290/55 |
| 8,736,093 B2 * | 5/2014 | Kii | F03D 7/028 | 290/44 |
| 8,870,553 B2 * | 10/2014 | Lavender | F04B 9/04 | 417/442 |
| 9,004,864 B2 * | 4/2015 | Stimm | F03D 1/0641 | 416/27 |
| 9,103,438 B2 * | 8/2015 | Caldwell | F03D 9/001 | |
| 9,194,371 B2 * | 11/2015 | Stimm | F03D 1/0641 | |
| 9,328,720 B2 * | 5/2016 | Caldwell | F04B 1/00 | |
| 9,331,534 B2 * | 5/2016 | Yost | H02K 1/2793 | |
| 9,631,503 B2 * | 4/2017 | Ehrnberg | F03D 3/062 | |
| 9,797,373 B2 * | 10/2017 | Aihara | F03D 3/061 | |
| 2006/0056972 A1 | 3/2006 | Delong | | |
| 2006/0131890 A1 | 6/2006 | Gizara | | |
| 2007/0024058 A1 * | 2/2007 | McClintic | F03D 7/0236 | 290/44 |
| 2007/0036653 A1 | 2/2007 | Bak et al. | | |
| 2007/0138798 A1 * | 6/2007 | McClintic | F03D 7/0236 | 290/44 |
| 2008/0069696 A1 * | 3/2008 | Ball | F03D 1/0666 | 416/132 B |
| 2008/0240923 A1 | 10/2008 | Bonnet | | |
| 2008/0253892 A1 * | 10/2008 | Dehlsen | F03B 3/14 | 416/147 |
| 2009/0058095 A1 * | 3/2009 | McClintic | F03D 7/0236 | 290/55 |
| 2009/0140522 A1 * | 6/2009 | Chapple | F03D 7/02 | 290/43 |
| 2010/0109324 A1 * | 5/2010 | Ben-David | F03D 7/0272 | 290/8 |
| 2010/0295317 A1 * | 11/2010 | Mahawili | H02K 7/1869 | 290/55 |
| 2010/0303623 A1 * | 12/2010 | Dawoud | F03D 1/065 | 416/44 |
| 2011/0107684 A1 * | 5/2011 | Flores | F03D 80/70 | 52/29 |
| 2012/0045327 A1 * | 2/2012 | Caldwell | F03D 15/20 | 416/1 |
| 2012/0060684 A1 * | 3/2012 | Lavender | F04B 9/04 | 92/12.1 |
| 2012/0061958 A1 * | 3/2012 | Tsutsumi | F03D 9/001 | 290/44 |
| 2012/0076652 A1 * | 3/2012 | Ventzke | F16F 9/53 | 416/1 |
| 2012/0096844 A1 * | 4/2012 | Caldwell | F03D 9/001 | 60/327 |
| 2012/0117958 A1 * | 5/2012 | Caldwell | F03D 9/002 | 60/327 |
| 2012/0133342 A1 * | 5/2012 | Murata | F03D 9/003 | 322/21 |
| 2012/0280503 A1 * | 11/2012 | Mahawili | F03D 9/00 | 290/52 |
| 2013/0009612 A1 * | 1/2013 | Caldwell | F03D 9/002 | 322/40 |
| 2013/0134708 A1 * | 5/2013 | Hamano | F03D 7/0264 | 290/43 |
| 2013/0149171 A1 * | 6/2013 | Caldwell | F03C 1/0409 | 417/53 |
| 2013/0214537 A1 * | 8/2013 | Hashimoto | F03D 15/00 | 290/55 |
| 2013/0221676 A1 * | 8/2013 | Caldwell | F03D 9/001 | 290/55 |
| 2013/0226458 A1 * | 8/2013 | Nakamura | G01R 21/00 | 702/3 |
| 2013/0234436 A1 * | 9/2013 | Kii | F03D 7/028 | 290/44 |
| 2013/0287572 A1 * | 10/2013 | Ehrnberg | F03D 3/062 | 416/147 |
| 2014/0054893 A1 * | 2/2014 | Lindholdt | F03D 7/02 | 290/44 |
| 2014/0070534 A1 * | 3/2014 | Hamano | F03D 11/026 | 290/43 |
| 2014/0234120 A1 * | 8/2014 | Aihara | F03D 3/061 | 416/243 |

(56) References Cited

U.S. PATENT DOCUMENTS

2015/0240783 A1* 8/2015 Kii ................. F03D 7/0204
                                                290/44
2015/0244220 A1* 8/2015 Yost ............... H02K 1/2793
                                                310/156.12
2016/0208898 A1* 7/2016 Caldwell ........... F03D 7/0296

* cited by examiner

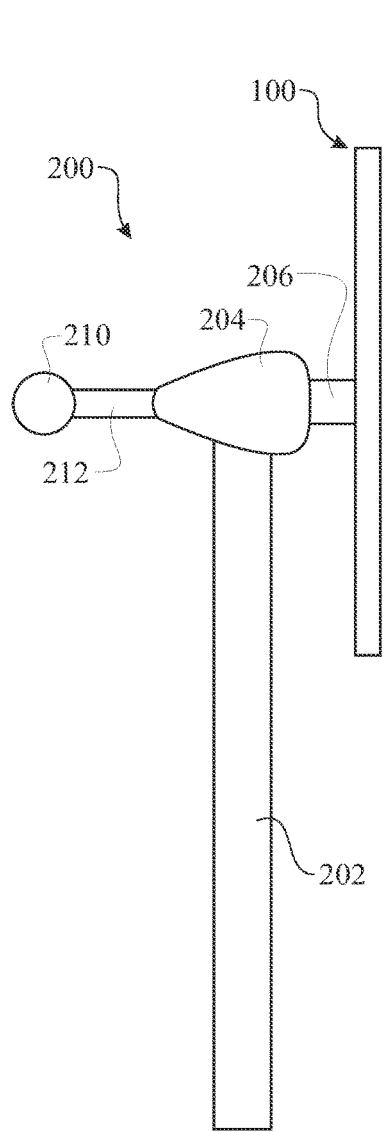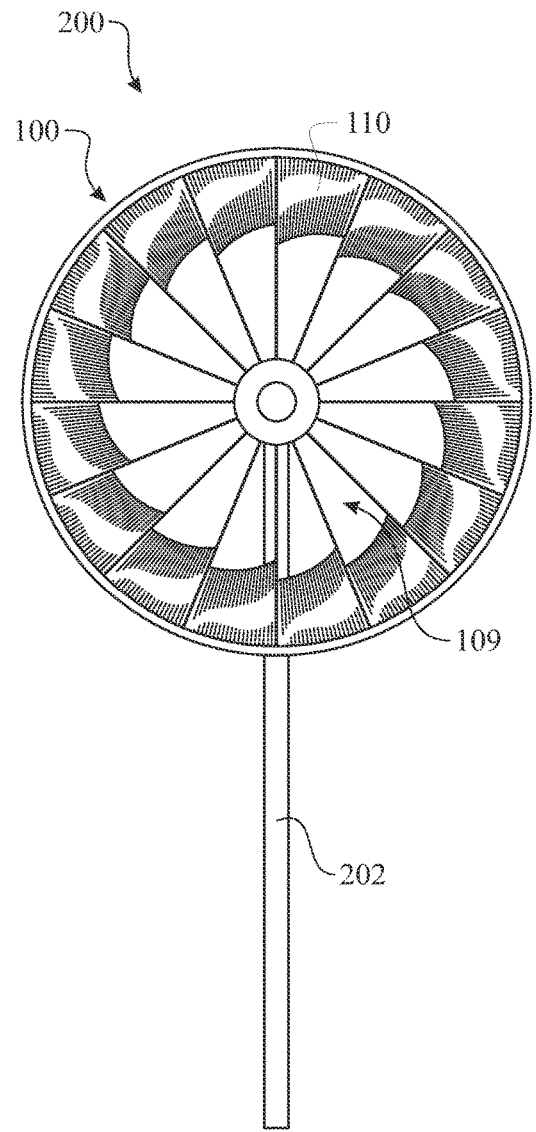
*FIG. 10*          *FIG. 11*

WIND OR WATER BASED POWER GENERATING SYSTEM

CROSS-REFERENCE TO RELATED APPLICATION

This Non-Provisional Utility Patent Application is a Continuation-In-Part Utility claiming the benefit of co-pending Non-Provisional Utility patent application Ser. No. 12/825,857, filed on Jun. 29, 2010 (scheduled to issue as U.S. Pat. No. 8,668,455), which is a Continuation-In-Part Utility claiming the benefit of co-pending U.S. Non-Provisional patent application Ser. No. 12/496,769, filed on Jul. 2, 2009, (Issued as U.S. Pat. No. 7,775,760), all of which are incorporated herein in their entireties.

FIELD OF THE INVENTION

The present disclosure generally relates to an apparatus and method for converting wind or water flow to electrical energy. More particularly, the present disclosure relates to a turbine wheel having a plurality of blades disposed about an internal edge of a peripheral rim.

BACKGROUND OF THE INVENTION

Windmills and other wind driven turbines generally comprise a series of blades projecting radially from a centrally located hub. This configuration provides several limitations. A first limitation is efficiency. The energy utilized to turn an object is referred to as torque. The torque is calculated at a force times a distance from the center of rotation. The force applied near the center of rotation has a significantly lower impact than a force applied towards the outer edge of the blades, although resistance is created along the entire length of the blade. A second limitation is the potential injury or death to birds. Turbines of common windmills have a plurality of blades, which are spatially configured, allowing birds to fly between the swirling turbines. This poses a risk whereby one of the blades could collide with the passing bird.

A first known blade discloses a rotor blade, which includes a main blade and an extension nap, which is translationally moveable relative to the main blade. The main blade and transition blade at least form an airfoil lifting surface of the entire blade. The dimension of the airfoil lifting surface is variable by translationally moving the extension flap relative to the main blade.

A second known reference discloses self starting vertical-axis wind turbine, for economically competitive power production by driving large grid-corrected AC generators. The wind turbine includes a variable blade pitch-angle from 0 to 60 degrees, wherein the blades following variable wind speed for maximum efficiency and to keep constant turbine speed; a variable blade camber to optimize lift-to-drag ratio, controlled by pitch and cyclical variation of incidence-angle; improved airfoil shape of cambered blades; low cost automatic gear-train for two constant turbine speeds; protection against overload and prevention of power surge during wind gusts; low stress three-legged high tower assembled with nacelle and tail structure on ground level. This enables a tower to be built to any height required to harness maximum wind energy.

Yet another known embodiment discloses a wind or water flow energy converter that includes a wind or water flow actuated rotor assembly. The rotor includes a plurality of blades; the blades of are variable in length to provide a variable diameter rotor. The rotor diameter is controlled to fully extend the rotor at low flow velocity and to retract the rotor, as flow velocity increases such that the loads delivered by or exerted upon the rotor do not exceed set limits.

While another known embodiment discloses a rotation shaft which is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

And another known embodiment discloses a multi-axis turbine with an external upper covering, a tower structure with a plurality of vertical elongated members connected to each other with supporting horizontal elongated members, and a plurality of smaller blades on a rotation connected to a tower structure with a plurality of the rotation. One embodiment includes impact impellers connected to a rotation creating a swept area with a height to diameter ratio of greater than four. In one embodiment the impact impellers are connected to a rotation means thereby creating a swept area with a height to diameter ratio of greater than ten.

While another embodiment discloses a power plant which extracts energy from a free flowing fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

Yet another embodiment discloses a design of a wind turbine blade and a wind turbine by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. A method of controlling the wind turbine is also disclosed.

While another embodiment discloses a wind turbine system, which incorporates a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor, which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

And another embodiment discloses a wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the: wind turbine can be operated with a maximum output within the range of evading fatigue failure of the blades and rotor by adjusting the active annular plane area in accordance with wind speed.

Common windmills comprise a plurality (generally three) of masts or blades extending from a central hub. The design of the blades must be structurally sound to accommodate the applied forces. This requirement dictates a heavier construction to the masts or blades. The heavy construction increases the inertial force, which reduces the rotational speed of the turbine assembly. The mass of material increases the cost of fabrication, transport, and the like to the site. Alternately, exotic materials and structural designs can be used to reduce the weight, while increasing cost and complexity of fabrication.

Wind studies show that as the velocity of the wind doubles, the power of the wind or water is cubed. Thus, if a turbine at 12 MPH wind generates 10 watts of power, at 24 MPH it will produce 1,000 watts of power.

A turbine will increase speed as the velocity of the air or water is sped up. The power of a generator is also increased as the rotational speed is increased. The power of the generator is not necessarily the same power curve of the turbine driving the generator. Therefore, losses can be expected because of the power mismatch between turbine and generator.

The described device monitors the rpm of a generator either directly or indirectly and provides a value, which corresponds to the rpm of the turbine. This in turn, is used to determining the amount of load (power) to be generated.

The angle difference of wing and wind is known as the Angle Of Attack (AOA). Experiments have determined that the optimum AOA is approximately 28° in a "climb angle" for a blade or wing. The closer the AOA can be to the 28°, the more power that can be generated. Two methods can be used to keep this angle of attack (AOA) constant. One is to pivot the blades to make the proper angle. This would keep the RPM of the turbine rather constant. The changing of the blade angle is used on large turbines. The other method to have the AOA stable is to change the rpm of the turbine.

Therefore, a wind driven turbine wheel with improved efficiency and a focus on bird safety is needed. The method described below is to change the rpm and the power extracted to keep the blades of the turbine at the optimum AOA for maximum power generation. The method described will better fit small turbines with a diameter of perhaps no more than 150 feet.

SUMMARY OF THE INVENTION

The present disclosure is generally directed to a wind driven turbine, and more specifically to a turbine blade having a peripheral rim assembled to a central hub via a plurality of spokes. A series of airfoil blades are disposed along an interior edge of the peripheral rim, being rotationally attached to the plurality of spokes. The blades leave an airflow breach between an interior edge of the blade and the central hub.

In some embodiments, the wind turbine apparatus may include:
  a peripheral rim having a rim radius defined from a rim center to an interior edge of the rim;
  a central hub having a hub radius defined from a hub center to an exterior edge of the hub;
  a radial span dimension being defined as rim radius minus the hub radius;
  a plurality of spokes assembling the central hub to a rotationally centralized position within the peripheral rim; and
  a series of blades having a radial length being significantly less than the radial span dimension;
  wherein the each of the blades is assembled to the wind turbine apparatus positioning the blades within the peripheral ring and proximate the interior edge of the rim, leaving an airflow gap between an interior edge of the blades and the exterior edge of the hub.

In a second aspect, a leading edge of the blade is rotationally assembled to a spoke.

In another aspect, a trailing edge is assembled to the spoke via an adjusting mechanism.

In yet another aspect, the adjusting mechanism is operationally controlled via a feature within the respective spoke.

In yet another aspect, the adjusting mechanism is operationally controlled via a feature within the respective spoke by rotating the spoke or a member within the spoke.

In yet another aspect the plurality of spokes are configured having two adjacent spokes overlapping.

In yet further aspect, the adjusting mechanism is operationally controlled via a tension member which is provided through a hollow portion of the spoke and controlled via a winding mechanism located proximate or within the central hub.

In yet another aspect, the trailing edge is assembled to a spoke via a breakaway mechanism.

In yet another aspect, the break away mechanism further comprising a means for automatically restoring the trailing edge to an operable configuration.

In yet aspect, breakaway mechanism is integrated with the adjusting mechanism.

In yet another aspect, the turbine wheel engages with an electrical power generator, with the assembly being positioned upon a vertical riser support.

In yet another aspect, the deployed turbine wheel can include a counterbalance assembly.

In yet another aspect, the deployed assembly can additionally include a rotational means, rotating about a vertical axis to reduce the frontal area respective to the airflow.

In yet another aspect, the turbine wheel comprises a plurality of masts extending radially from an axle, each mast comprising a blade. The masts are supported via a planar tension cable spanning between distal ends of adjacent masts and a radial tension cable spanning between the distal end of each mast and each of the two ends of the axle.

In yet another aspect, the blades can be replaceable with one's having different shapes, sizes, surface areas, and aerodynamic characteristics.

In a second embodiment, the wind turbine apparatus may include:

a vertical riser support extending upward from a supporting surface;

a turbine housing carried by the vertical riser support;

a wind driven turbine blade subassembly in operational communication with a turbine shaft;

a hydraulic pump carried by the turbine housing and in operational communication with the turbine shaft;

a hydraulic motor comprising a hydraulic motor drive shaft, wherein the hydraulic motor is distally located from the turbine housing and in hydraulic communication with the hydraulic pump through hydraulic lines; and an electrical power generator comprising a generator drive shaft in rotational communication with the hydraulic motor drive shaft, wherein rotation of the wind driven turbine blade subassembly rotationally drives the hydraulic pump, wherein the hydraulic pump flows hydraulic fluid through the hydraulic lines to the hydraulic motor, wherein the hydraulic fluid flowing through the hydraulic lines drives rotation of the hydraulic motor;

wherein the hydraulic motor drives rotation of the electric power generator, which outputs electric power.

In yet another aspect, the electrical output of the electric power generator is governed by an electric power output controller module.

In yet another aspect, the electric power output controller module varies a resistance of a current flow.

In yet another aspect, the electric power output controller module varies a resistance of a current flow, optimizing power generation efficiency and power output.

In yet another aspect, the electric power output controller module identifies a rotational speed of the hydraulic motor drive shaft and varies a resistance of a current flow based upon a predetermined rotational speed of the hydraulic motor drive shaft.

In yet another aspect, the electric power output controller module identifies a rotational speed of the generator drive shaft and varies a resistance of a current flow based upon a predetermined rotational speed of the generator drive shaft.

In another arrangement, the wind operated electrical power generating system may include:

a wind turbine comprising a turbine blade assembly attached to a turbine blade subassembly shaft, the turbine blade subassembly shaft being rotationally carried by a turbine housing, the turbine housing being supported by a vertical riser support structure;

a generator in one of direct and indirect operational communication with the turbine blade subassembly shaft, wherein rotation of the turbine blade subassembly shaft provides power to rotate an input shaft of the generator;

a rotational speed sensor arranged to sense a rotational speed of one of the turbine blade subassembly shaft and the generator shaft;

an electrical controller circuit in signal communication with the rotational speed sensor, wherein the electrical controller circuit identifies when a rotational speed determined by a signal from the rotational speed sensor is proximate a predetermined speed; and a potentiometer (variable resistor), wherein the electric potentiometer (variable resistor) increases a load upon the generator.

In yet another aspect, the system further comprises a power control module, wherein the power control module contains the electrical controller circuit and the potentiometer (variable resistor), wherein the potentiometer (variable resistor) is a manually adjusted potentiometer (variable resistor).

In yet another aspect, the electrical controller circuit further comprising at least one speed indicator, wherein each of the at least one speed indicator alerts a user when the electrical controller circuit identifies when a rotational speed determined by a signal from the rotational speed sensor is proximate a predetermined speed associated with each of the at least one speed indicator.

In yet another aspect, the electrical controller circuit further comprises a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators.

In yet another aspect, the electrical controller circuit further comprises:

a power control module, wherein the power control module contains:

the electrical controller circuit, which further includes a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators; and a plurality of the potentiometers (variable resistors), wherein each of the plurality of potentiometers (variable resistors) is associated with a respective speed indicator of the plurality of speed indicators.

In yet another aspect, the electrical controller circuit further comprises a transformer integrated in electric communication between the potentiometer (variable resistor) and a grid tie.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 10 presents an elevation side view of a turbine wheel integrated into a wind power harnessing structure;

FIG. 11 presents an elevation front view of the wind power harnessing structure of FIG. 10;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. For purposes of description herein, the terms "upper", "lower", "left", "rear", "right", "front", "vertical", "horizontal", and derivatives thereof shall relate to the invention as oriented in FIG. 1, where applicable. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally directed to a turbine wheel 100 and the integration of the turbine wheel 100 onto a turbine deployment assembly 200. The turbine wheel 100 and the respective application are detailed hereinafter.

Figure 1:
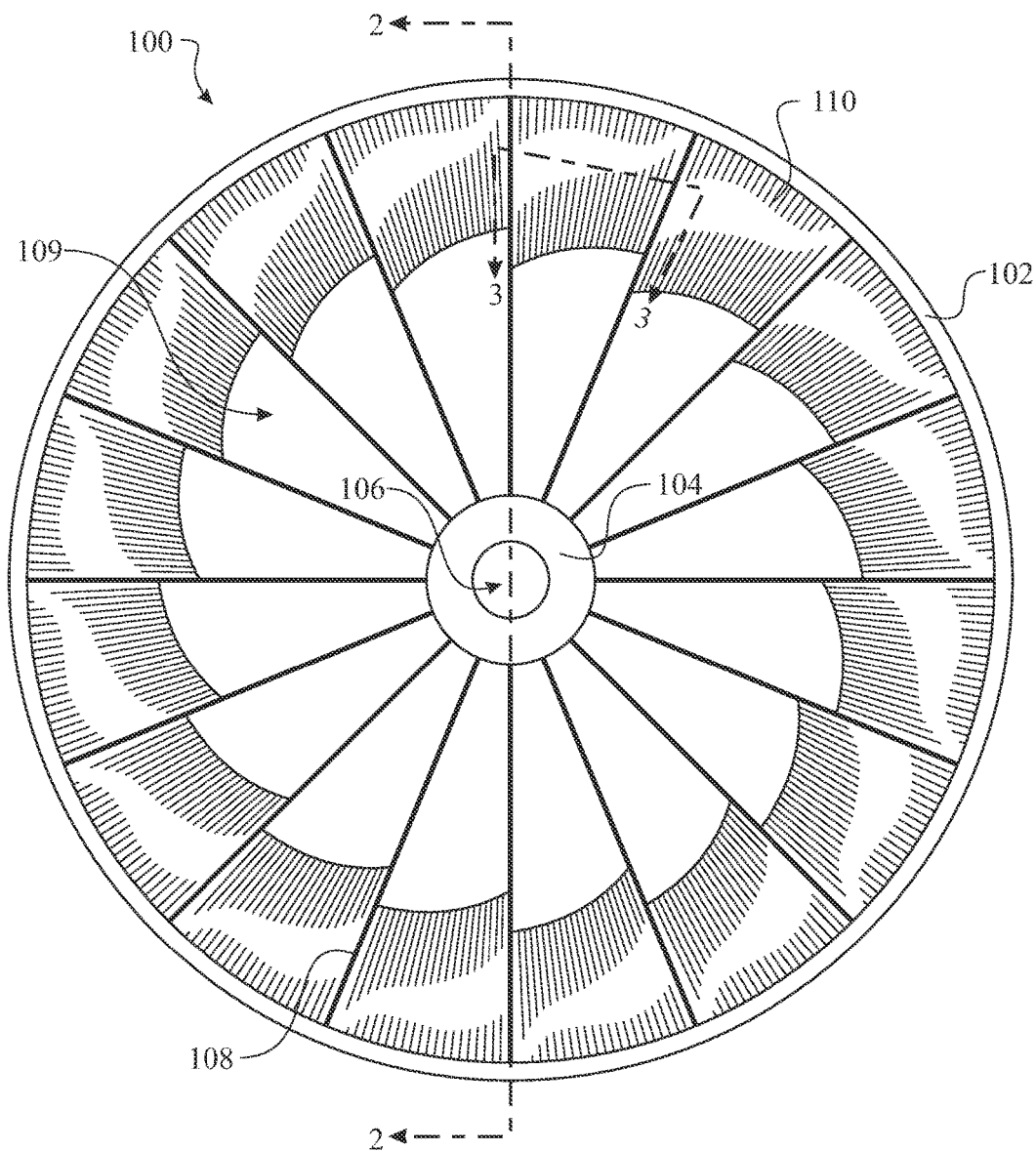
FIG. 1 presents a front view of an exemplary embodiment of a turbine wheel illustrating the general components of the present invention.
Figure 2:
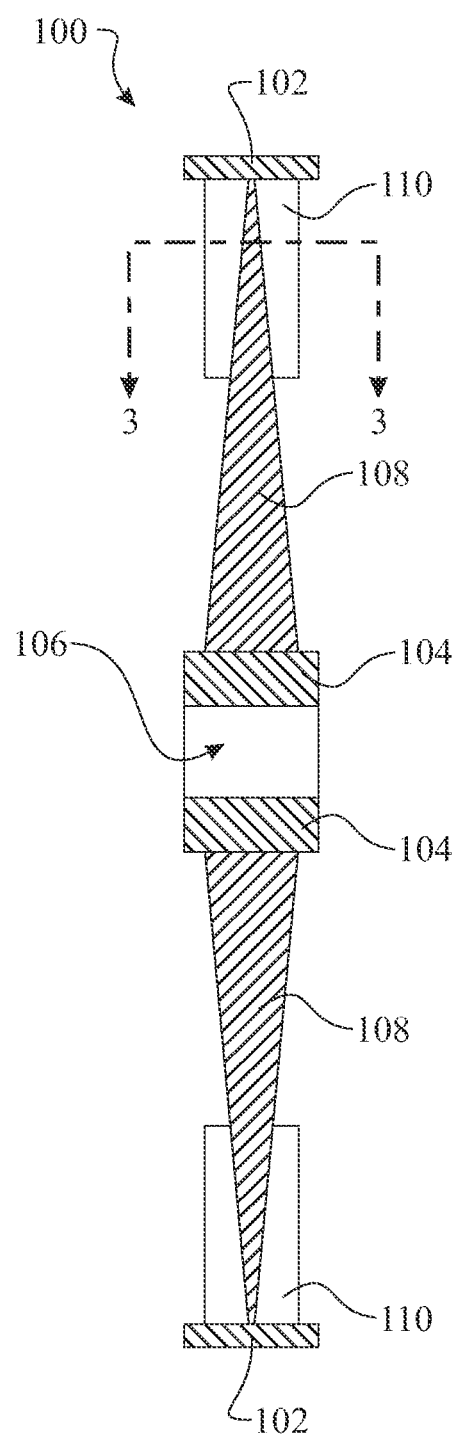
FIG. 2 presents a sectional side view of the turbine wheel taken along section line 2-2 of FIG. 1.
Figure 3:
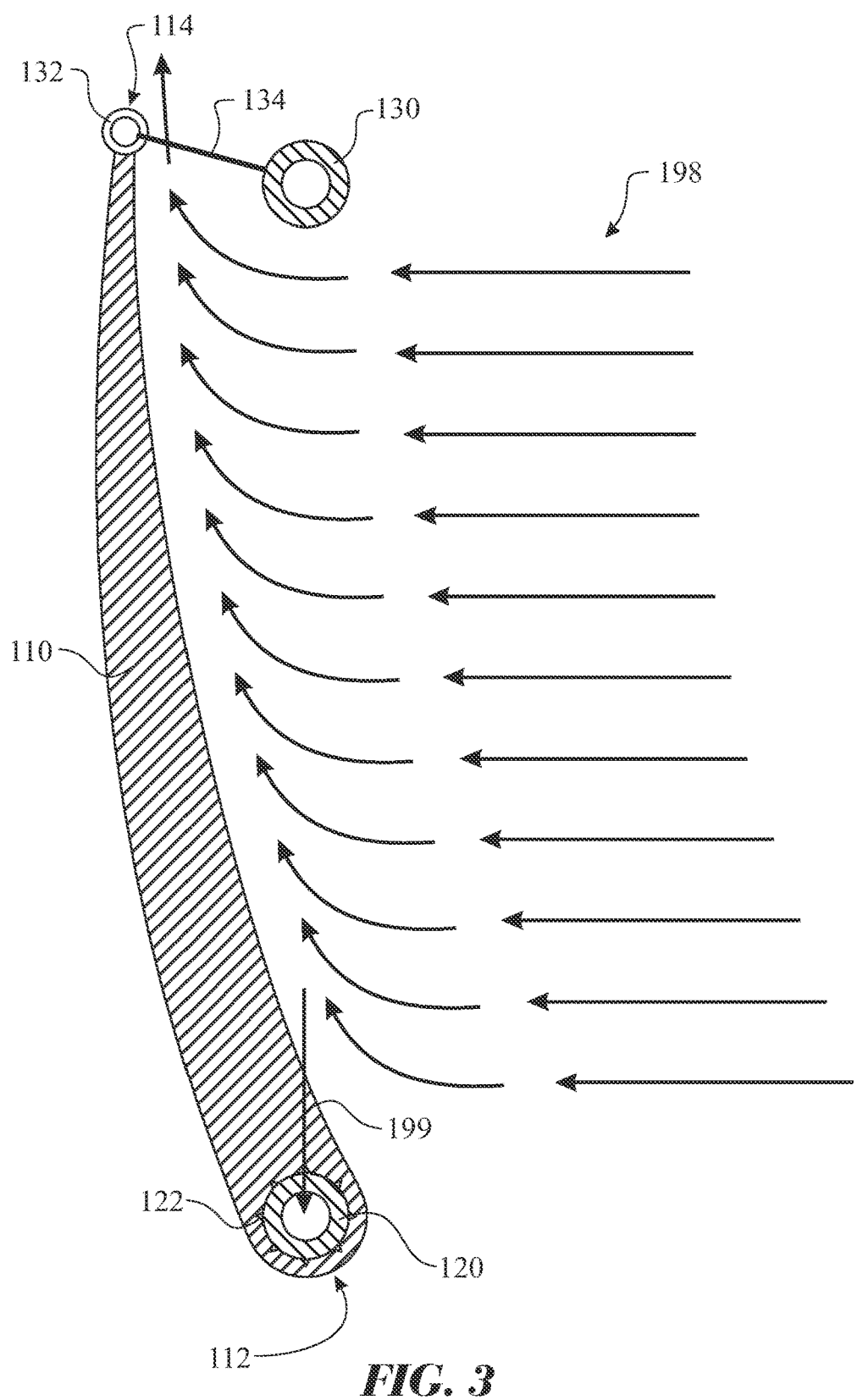
FIG. 3 presents a sectional end view of a turbine blade taken along section line 3-3 of FIG. 1 introducing an effect of wind flow on the blade.

Referring initially to FIGS. 1 through 3 of the drawings, an illustrative embodiment of a turbine wheel, hereinafter apparatus, is generally indicated by reference numeral 100 in FIG. 1. The turbine wheel assembly 100 includes a turbine center hub 104 being centrally assembled to a turbine outer rim 102 via a plurality of turbine spokes 108. The turbine center hub 104 includes an axle bearing 106, which is centrally assembled, allowing the turbine center hub 104 to rotate about an axle that would be assembled to the axle bearing 106. The axle and axle bearing 106 can be of any known rotational interface capable of supporting the forces exerted by the wind and respective motion of the turbine wheel assembly 100 about the axle. The turbine spokes 108 are preferably assembled having a tensile force. The distributed tensile force ensures the turbine outer rim 102 remains in the circular shape, while reinforcing the assembly.

A series of turbine blades 110 are provided, having a blade leading edge 112 and a blade trailing edge 114. The distance between the blade leading edge 112 and the blade trailing edge 114 is preferably equal to or greater than a span between two adjacent spokes 108. This shape allows for the blade leading edge 112 to be assembled to a respective lead turbine spoke 108 and the blade trailing edge 114 to be assembled to the respective trailing turbine spoke 108. It would be preferable that the blade leading edge 112 be pivotally assembled to a blade leading edge pivot 120, wherein the blade leading edge pivot 120 can be utilized as the lead turbine spoke 108. The blade leading edge pivot 120 can include a hollow centerline, allowing the turbine spoke 108 to be inserted therethrough. A plurality of anti-slip interface 122 can be included ensuring the blade leading edge pivot 120 rotates in conjunction with the turbine blades 110, or excluded allowing the blade leading edge pivot 120 to rotate independently respective to the turbine blades 110.

The turbine blades 110 has a length parallel to the turbine spoke 108 that is significantly shorter than the distance between the exterior of the turbine center hub 104 and the interior of the turbine outer rim 102. This provides an airflow interior region 109 within an interior of the turbine outer rim 102 allowing airflow 198 to pass through the turbine wheel assembly 100. This configuration provides a centroid of the effective force closer to the turbine outer rim 102, thus increasing the generated torque, reduces the rotational resistance, thus increasing the efficiency.

The trailing edge can include an incident angle control mechanism, including an incident angle controller 130, an angle control cleat 132 and an angle control tether 134. In the exemplary embodiment, the turbine blade 110 pivots about the blade leading edge pivot 120 and is retained at an incident angle via the angle control tether 134. The angle control tether 134 is a cabling, which is released or retracted via an incident angle controller 130. The incident angle controller 130 can either rotate to adjust a released length of the angle control tether 134, or the angle control tether 134 can be routed through the incident angle controller 130 and released or retracted via a remotely located winding mechanism (not shown, but well understood as a motor, gearing and spool). The angle control tether 134 is secured to the turbine blades 110 via an angle control cleat 132 located proximate the blade trailing edge 114 of the turbine blades 110.

Figure 4:
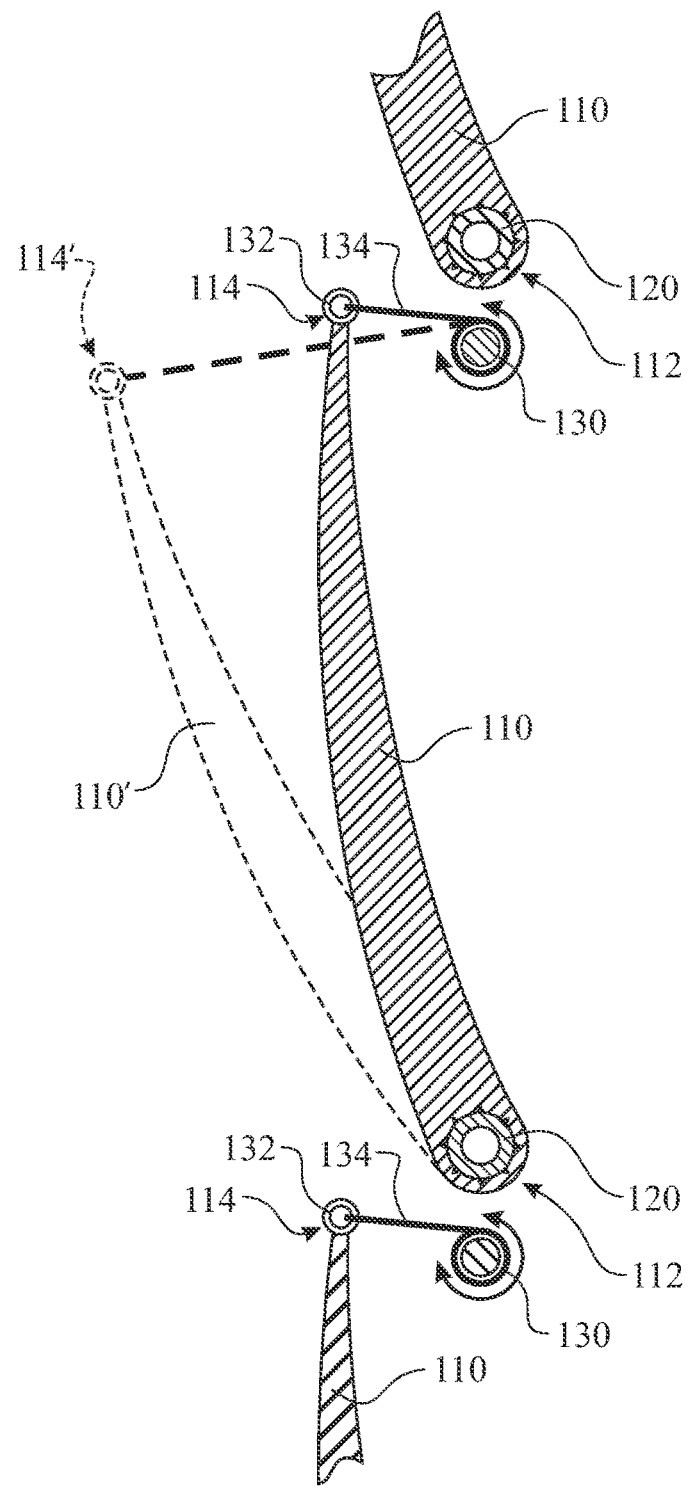
FIG. 4 presents a sectional end view of a series of turbine blades introducing an incident angle controlling mechanism.

As the incident angle controller 130 releases the angle control tether 134, a wind flow 198 applies a force to the facing side of the turbine blades 110 allowing the turbine blades 110 to rotate into position turbine blades 110' and repositioning the blade trailing edge 114 to position blade trailing edge 114' as shown in FIG. 4. The illustration presents an embodiment where the incident angle controller 130 is solid and rotates to release or retract the angle control tether 134 to adjust the released length. The angle of incident changes the resultant rotational speed of the turbine blades 110, as referenced as a resultant blade motion 199. The turbine blades 110 are positioned having the blade leading edge 112 overlapping the blade trailing edge 114, with the blade leading edge 112 being arranged on the wind receiving side of the turbine blades 110.

It is understood that other incident angle control mechanisms can be used, including a cam and respective control arm, and the like.

Figure 5:
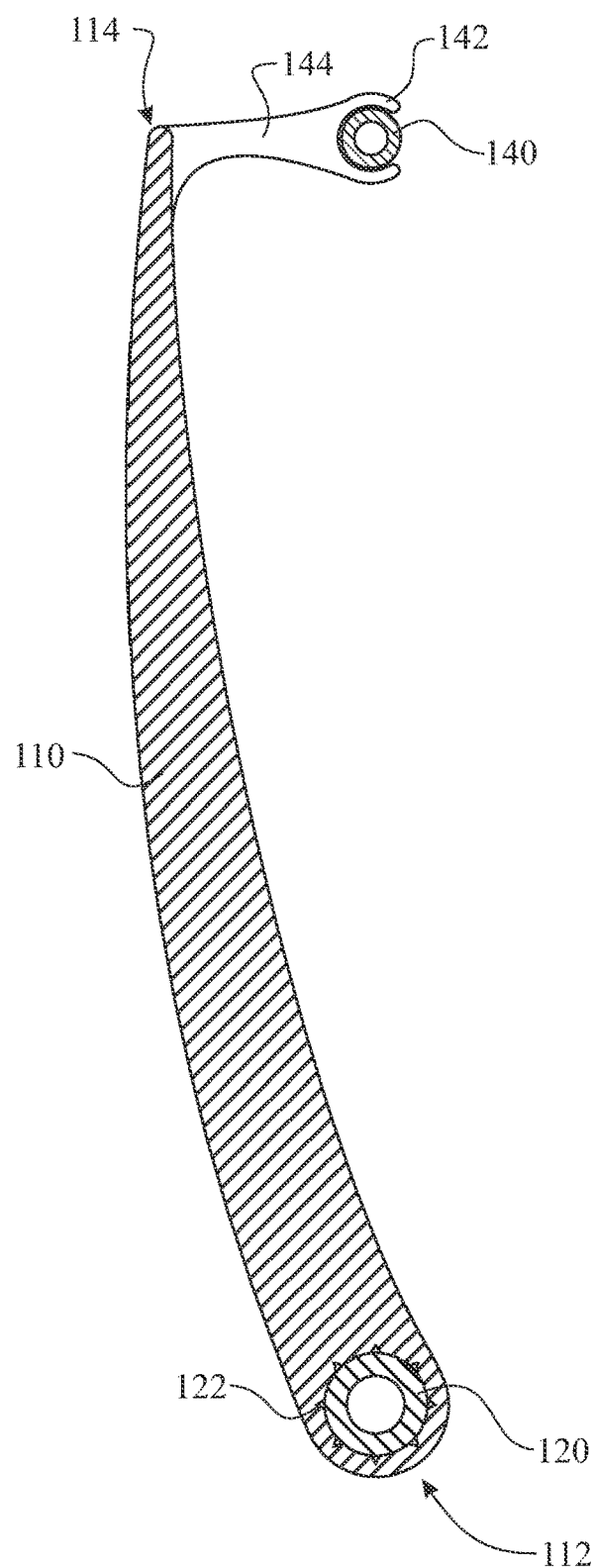
FIG. 5 presents a sectional end view of a turbine blade introducing an exemplary breakaway mechanism.
Figure 6:
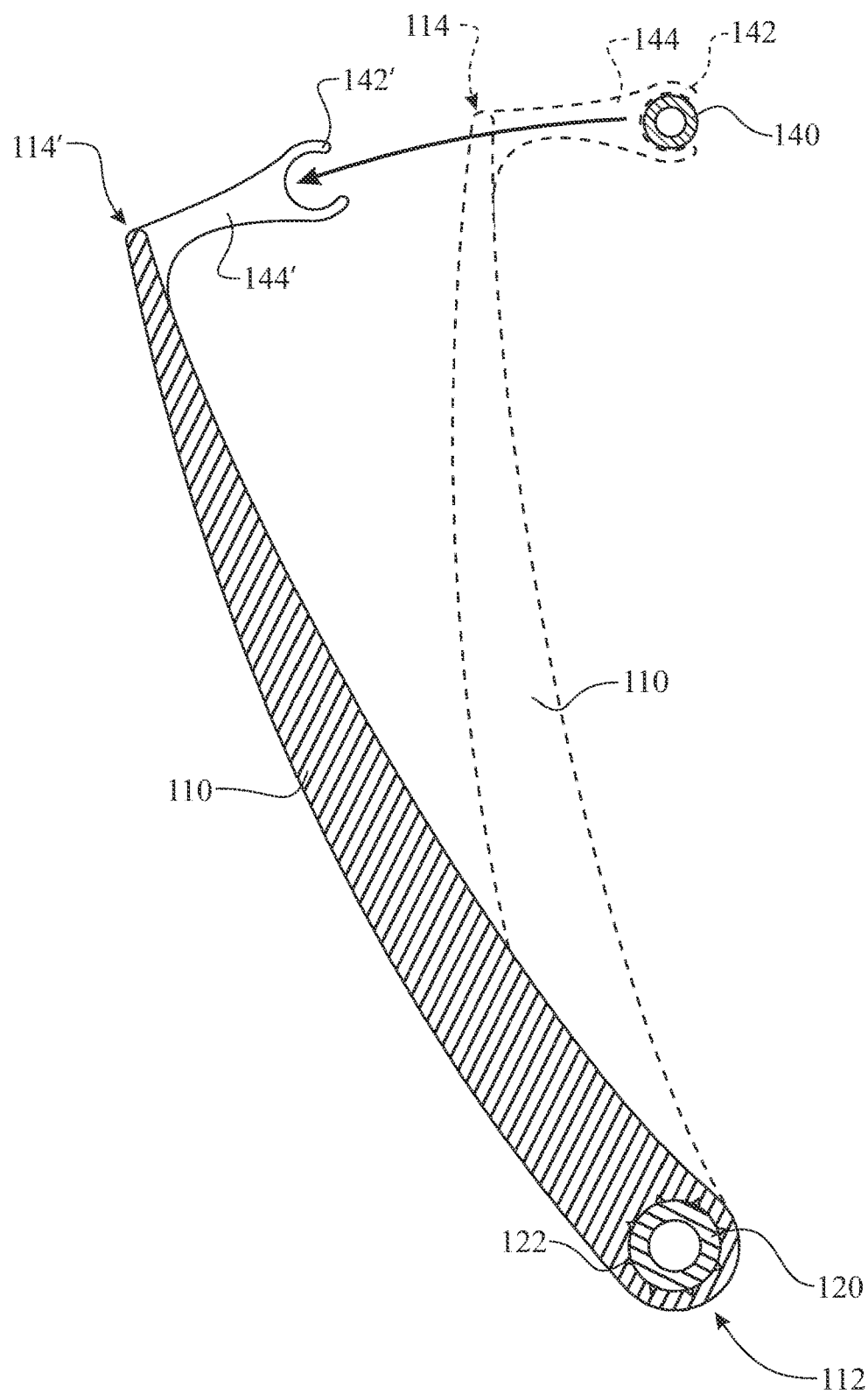
FIG. 6 presents a sectional end view of a turbine blade illustrating the operation of the breakaway mechanism of FIG. 5.

A breakaway mechanism can be incorporated to compensate when the turbine wheel assembly 100 encounters any unexpected excessive wind forces 198. One exemplary embodiment is presented in FIGS. 5 and 6. The breakaway mechanism detachably engages a breakaway clip 142 with a breakaway anchor 140. The breakaway clip 142 is secured to the blade trailing edge 114 via a breakaway frame 144. The breakaway clip 142 would detach from the breakaway anchor 140 when subjected to a predetermined force. An alternate configuration would utilize the incident angle mechanism of FIGS. 3 and 4. The incident angle controller 130 would include a ratcheting mechanism, which releases or free spools the angle control tether 134 when subjected to a predetermined force. It is understood that other configurations known by those skilled in the art can be integrated with the turbine wheel assembly 100, providing a breakaway mechanism.

Figure 7:
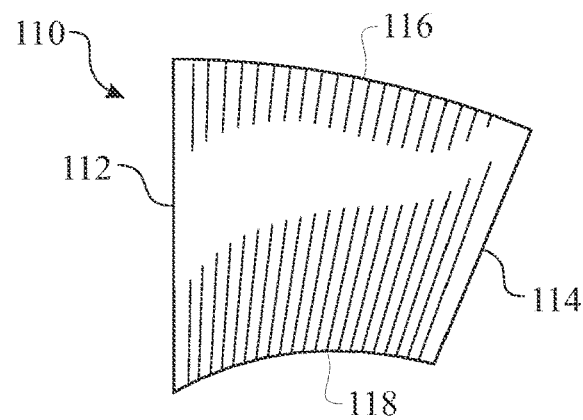
FIG. 7 presents a front view of a first exemplary turbine blade shape.
Figure 8:
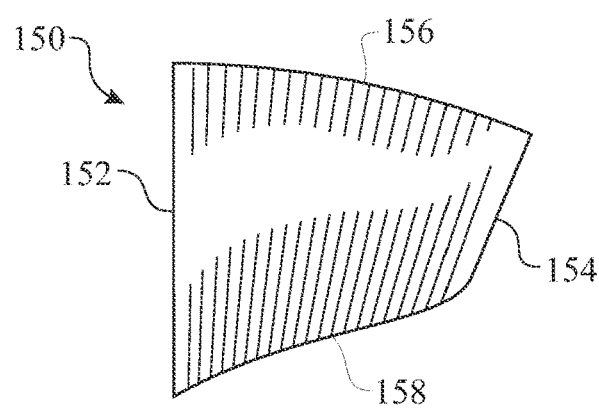
FIG. 8 presents a front view of a second exemplary turbine blade shape.
Figure 9:
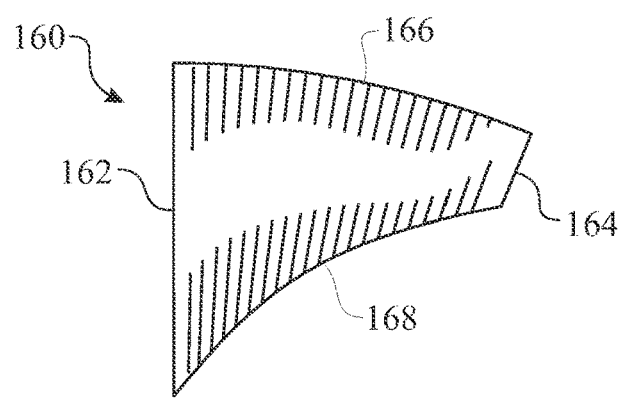
FIG. 9 presents a front view of a third exemplary turbine blade shape.

The turbine blades can be configured in a variety of shapes, as illustrated in FIGS. 7 through 9. A planar view of the turbine blades 110 is presented in FIG. 7, having an airfoil cross sectional shape bounded by a blade leading edge 112, a blade trailing edge 114, a posterior edge 116 and an interior edge 118. The turbine blades can be configured of a variety of cross sectional and peripheral shapes. The configuration defines the total surface area. The surface area, cross sectional shapes and peripheral shape all effect the efficiency of the turbine blades 110. The interior edge 118 provides an arched lower edge wherein the blade trailing edge 114 is equal to or slightly shorter than the blade leading edge 112. A planar view of a turbine blade 150 is presented in FIG. 8, having an airfoil cross sectional shape bounded by a blade leading edge 152, a blade trailing edge 154, a posterior edge 156 and an interior edge 158. The interior edge 158 provides an "S" shaped lower edge having a continuous line blending into the blade trailing edge 114, and wherein the blade trailing edge 114 is shorter than the blade leading edge 112. A planar view of a turbine blade 160 is presented in FIG. 9, having an airfoil cross sectional shape bounded by a blade leading edge 162, a blade trailing edge 164, a posterior edge 166 and an interior edge 168. The interior edge 168 provides an arched shaped lower edge wherein the blade trailing edge 164 is significantly shorter than the blade leading edge 162.

A turbine deployment assembly 200 is illustrated in FIGS. 10 through 15. A vertical riser support 202 provides a base member for the turbine deployment assembly 200. An electrical power generator 204 is pivotally assembled to the upper portion of the vertical riser support 202. The turbine wheel assembly 100 is in rotational communication with the electrical power generator 204 via a turbine wheel shaft 206. A counterbalance 210 can be incorporated providing a counterbalance to the turbine wheel assembly 100. The counterbalance 210 would be assembled to the turbine deployment assembly 200 via a counterbalance support beam 212.

Figure 12:
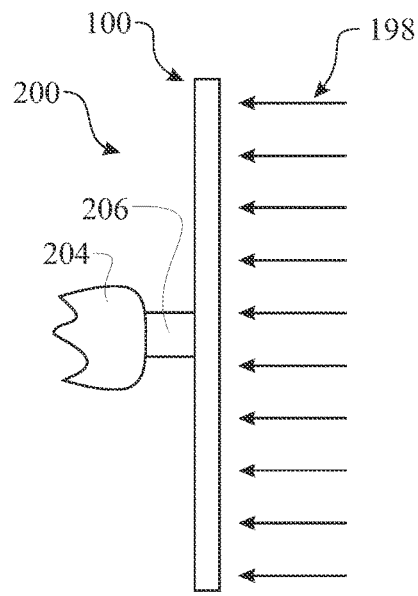
FIG. 12 presents a partial top view of the wind power harnessing structure of FIG. 10, configured perpendicular to an airflow.
Figure 13:
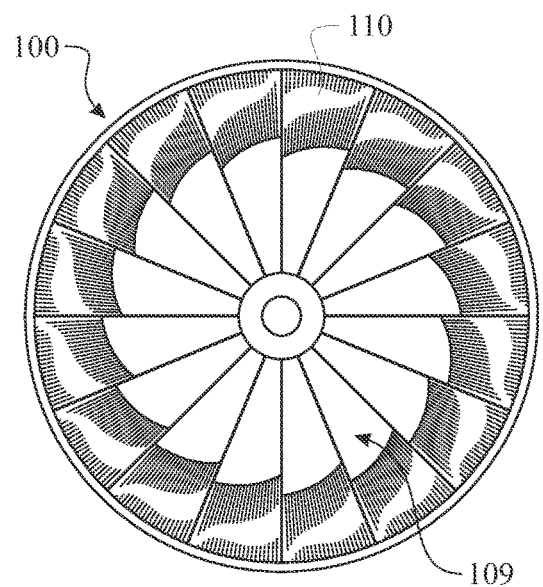
FIG. 13 presents a front view of the turbine wheel configured perpendicular to the airflow.
Figure 14:
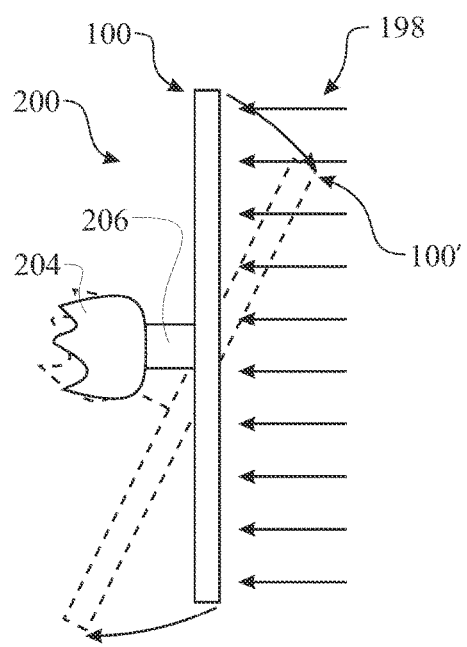
FIG. 14 presents a partial top view of the wind power harnessing structure of FIG. 10, rotated away from being perpendicular to the airflow.
Figure 15:
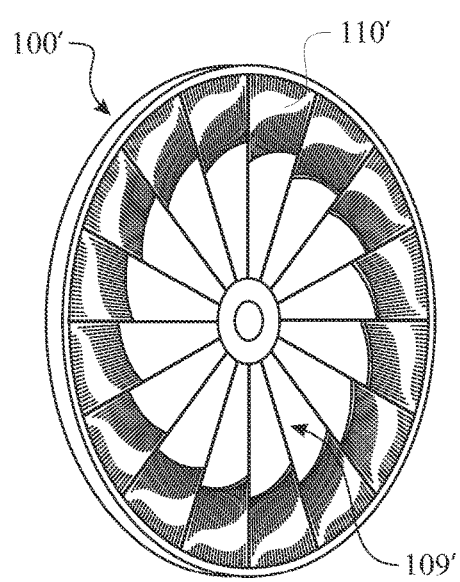
FIG. 15 presents a front view of the turbine wheel, rotated away from being perpendicular to the airflow.

The electrical power generator 204 is designed to rotate about a vertical axis parallel to a longitudinal axis of the vertical riser support 202 as shown in the top views of FIG. 14. The rotation positions the turbine wheel assembly 100 to rotated position turbine wheel assembly 100'. The rotation allows for several capabilities. The first, being positioning the turbine wheel assembly 100 perpendicular to the wind flow 198 as shown in FIG. 12, thus maximizing the frontal surface area as illustrated in FIG. 13. The second, being positioning the turbine wheel assembly 100 at an angle that is not perpendicular to the wind flow 198 as shown in FIG. 14, thus reducing the frontal surface area exposed to the wind flow 198 as illustrated in FIG. 15. This reduces any potential damage from excessive winds. The incident angle mechanism and the break away mechanism both additionally contribute to efficiency, reliability, and protection of the turbine deployment assembly 200.

Figure 16:
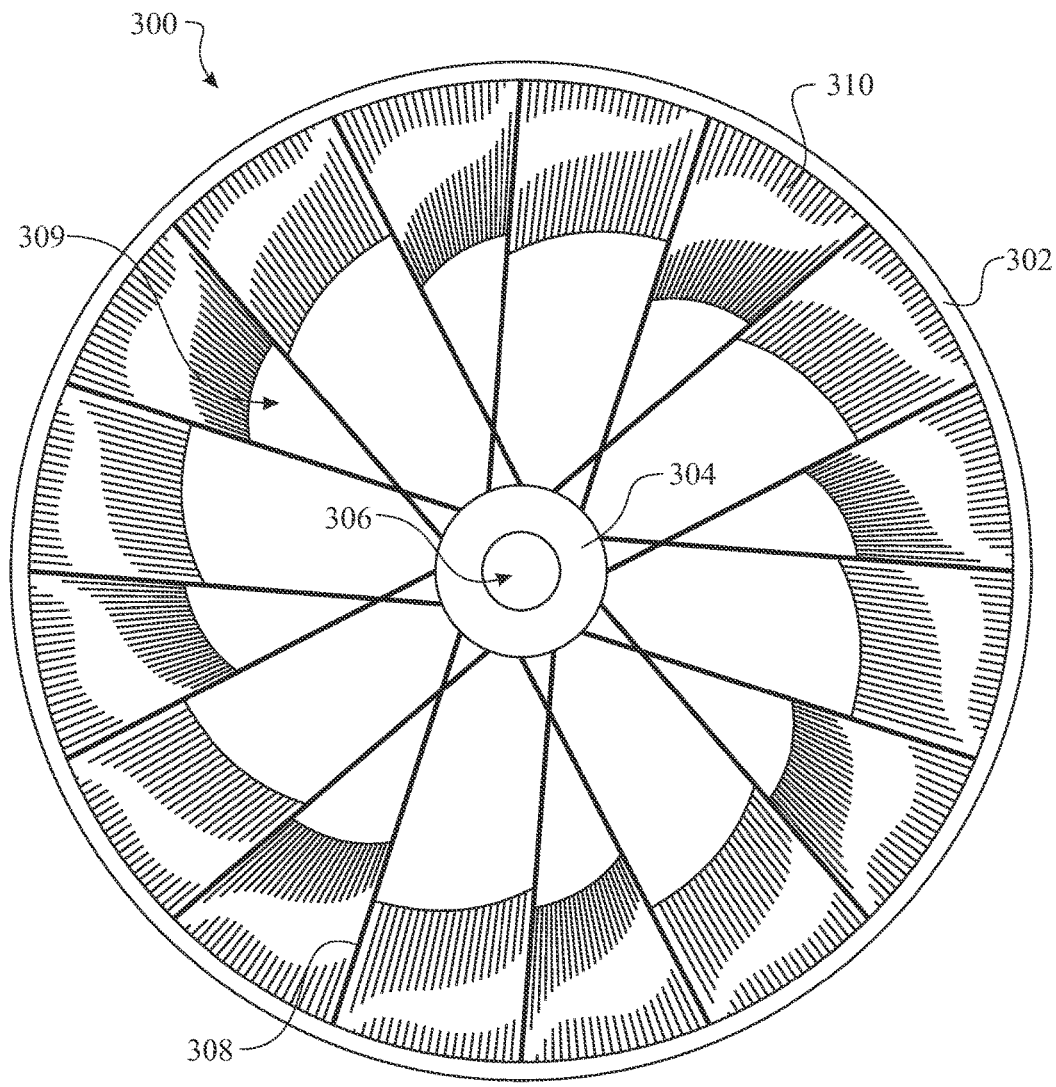
FIG. 16 presents a front view of a second exemplary embodiment of a turbine wheel assembling adjacent spokes in an overlapping configuration.

An alternate spoke configuration is presented in the exemplary embodiment referred to as a crossover spoke turbine wheel assembly 300, illustrated in FIG. 16. The crossover spoke turbine wheel assembly 300 is similar to the turbine wheel assembly 100. Like features of crossover spoke turbine wheel assembly 300 and turbine wheel assembly 100 are numbered the same except preceded by the numeral '3'. The turbine spokes 308 are arranged being fixed to the center hub 304 offset from the radial centerline. The turbine spokes 308 are configured whereby adjacent turbine spokes 308 overlap. The overlap between the spokes 308 occurs proximate the center hub 304.

Figure 17:
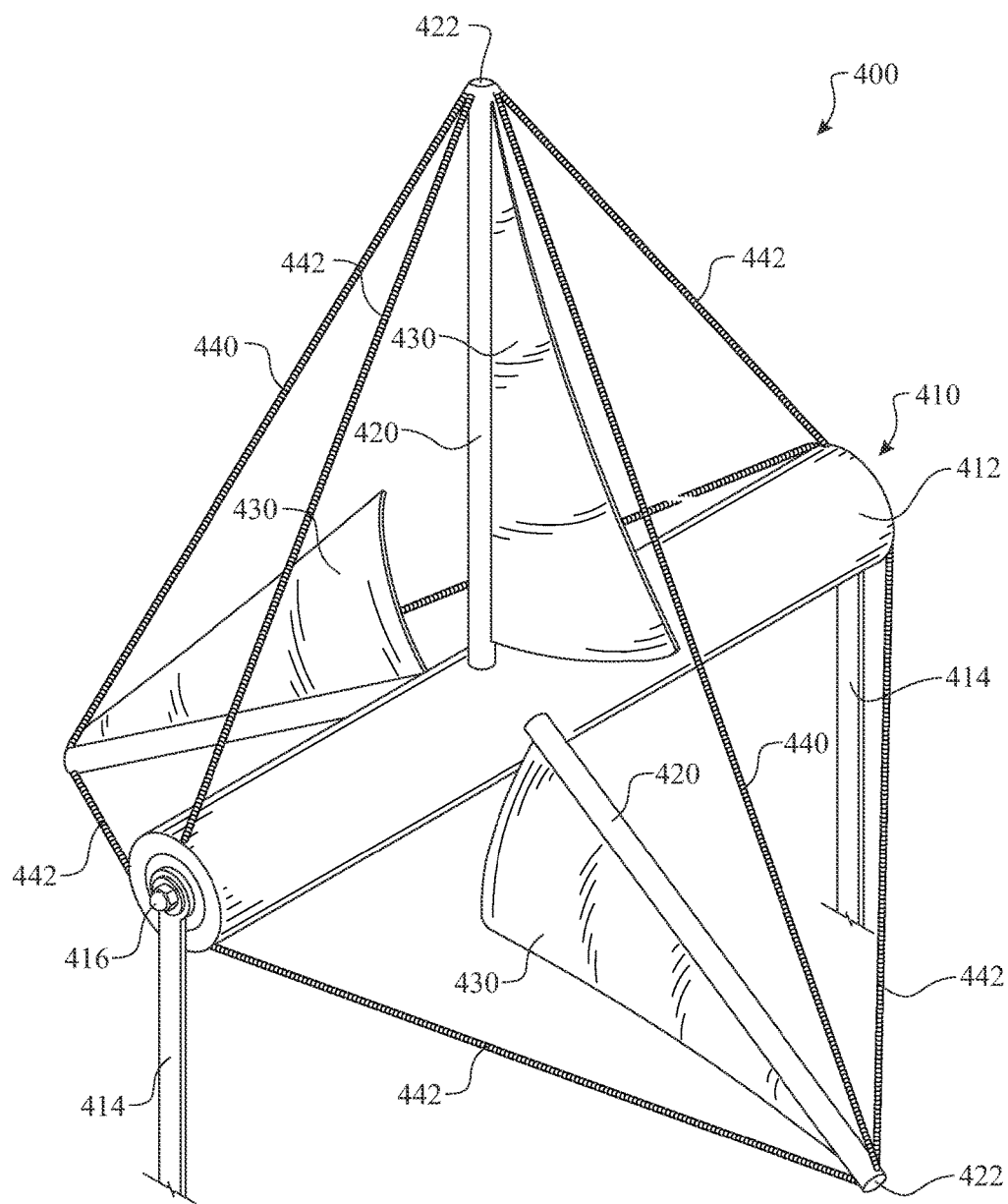
FIG. 17 presents an isometric view of a third exemplary embodiment of a turbine wheel utilizing a plurality of masts supported by an arrangement of tension cables.
Figure 18:
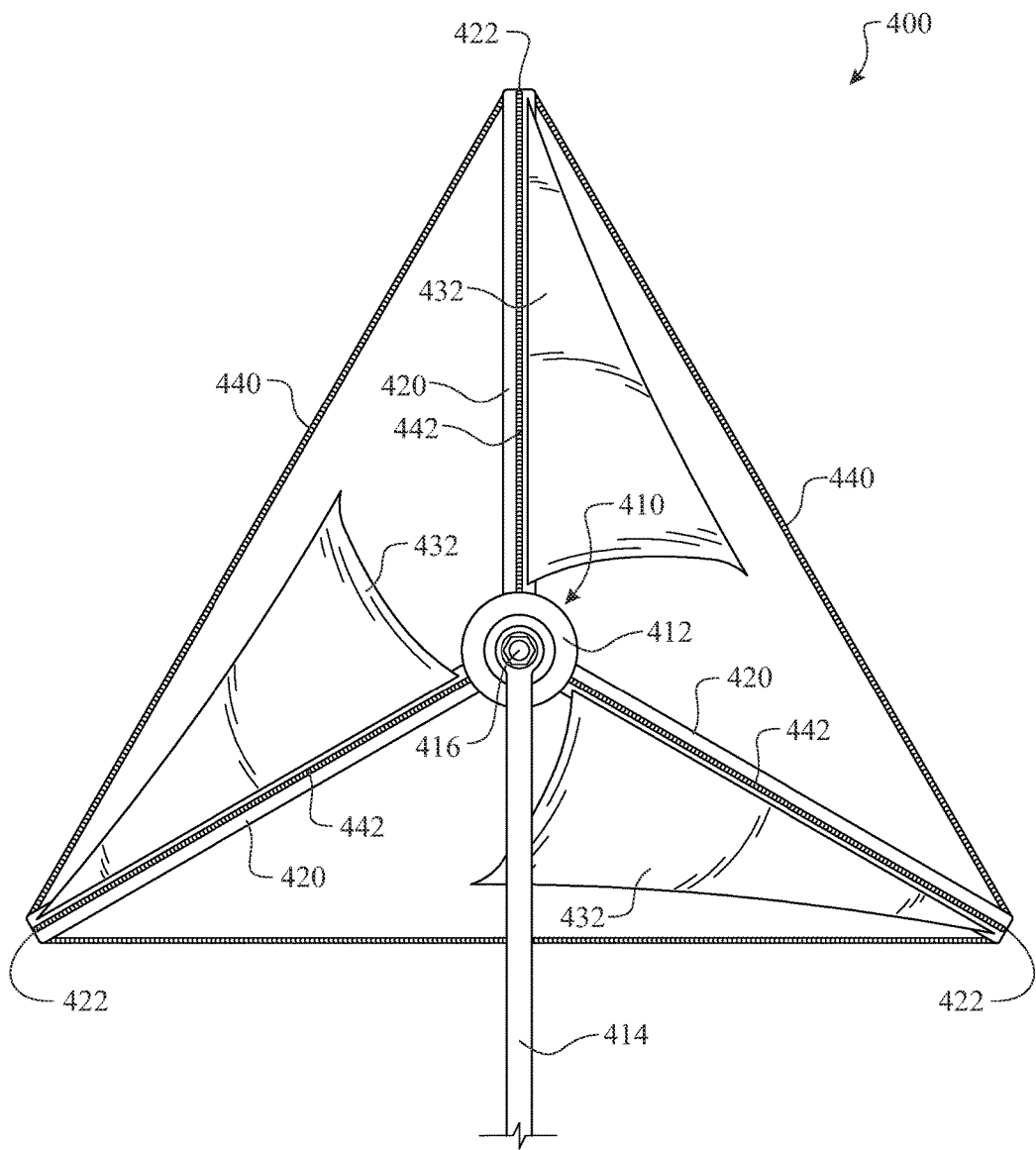
FIG. 18 presents a front elevation view of the third exemplary turbine wheel of FIG. 18.
Figure 19:
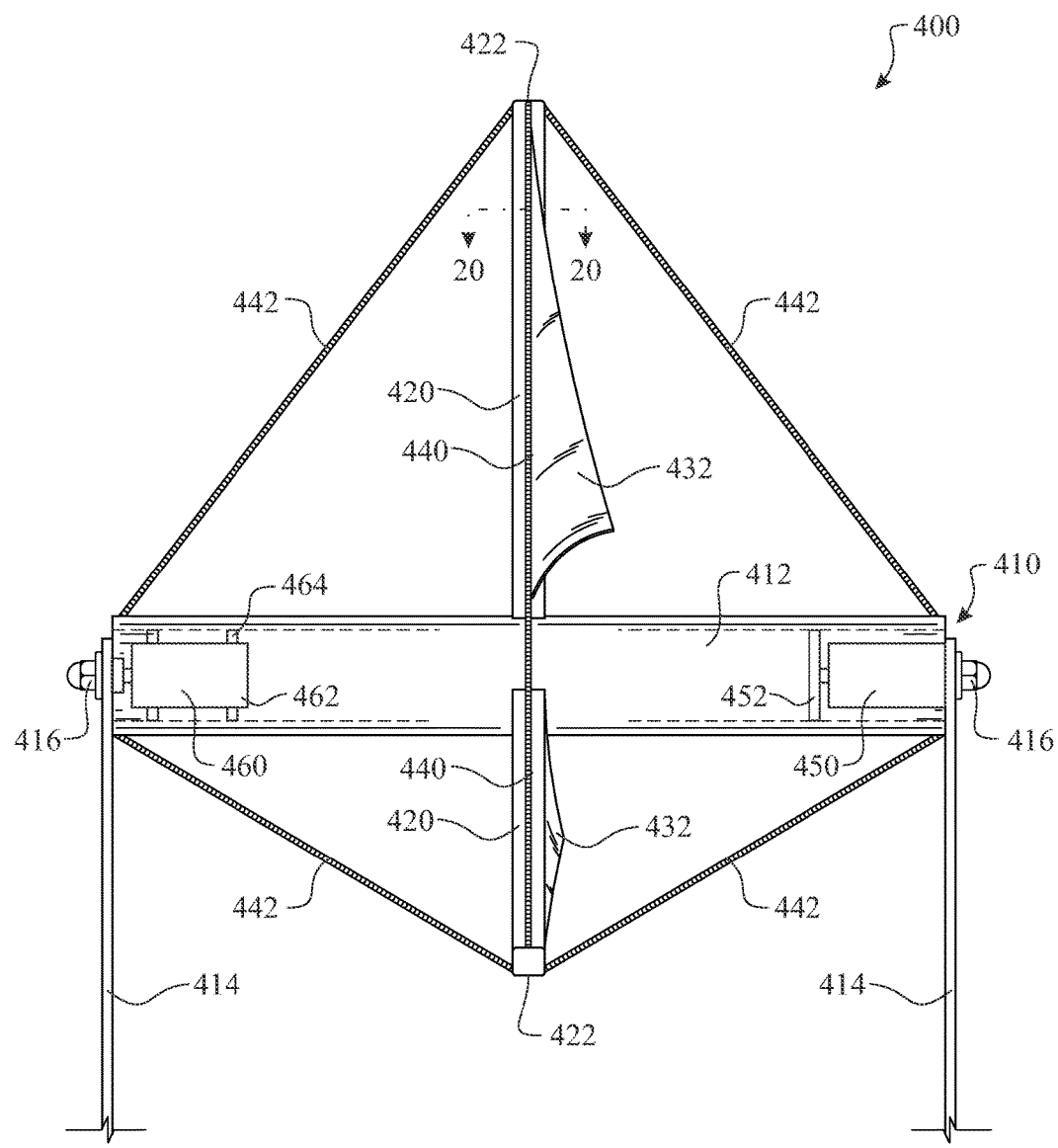
FIG. 19 presents a side elevation view of the third exemplary turbine wheel of FIG. 18.

Another exemplary embodiment is referred to as a cable supported mast turbine assembly 400, illustrated in FIGS. 17 through 19. The cable supported mast turbine assembly 400 is fabricated having a plurality of mast 420 extending radially from a central hub 412 of a power generating central hub assembly 410. The central hub 412 is supported by a pair of hub support members 414; having one hub support member 414 located at each end of the central hub 412. The central hub 412 is rotationally assembled to the hub support member 414 via a hub coupling member 416. A generator is provided in communication with the central hub 412, being placed within the central hub 412, adjacent to the central hub 412, or any other reasonable location. As the central hub 412 rotates, the generator creates electrical power. It is also understood that the rotational motion of the central hub 412 can be mechanically coupled to other objects to drive a motion of the other objects accordingly.

The masts 420 are supported by an arrangement of cabling. Mast-to-mast tension cables 440 span between mast distal ends 422 of each adjacent mast 420. Each mast-to-mast tension cable 440 is tightened having a tensile force equal to the others. The mast-to-mast tension cables 440 provide stability to the mast 420 against a torsional force generated by the rotation of the central hub 412. A mast-to-axle tension cable 442 spans between each end of the central hub 412 and the mast distal end 422 of each of the masts 420. The plurality of mast-to-axle tension cables 442 provides stability against any cross-directed forces, such as wind, vibrations, and the like.

The cables 440, 442 can be secured to the respective member using any reasonable and well-known interface. The interface can include a tensioning member, such as a turnbuckle, and the like. The cables 440, 442 can be fabricated using any of many well-known methods, including a single cable, a series of wrapped or bound smaller cables, and the like. The cross-sectional shape of the mast 420 are preferably aerodynamic, such as round (as shown), wing-shaped, and the like.

A turbine blade can be provided as either a pliant turbine blade 430 or a rigid turbine blade 432. When incorporating the pliant turbine blade 430, the cable supported mast turbine assembly 400 can include a tether or blade tensioning cable 444 spanning between a unattached corner or other region of the pliant turbine blade 430 and a location proximate an axial end of the central hub 412. The blade tensioning cable 444 can be fixed or adjustable. A motor can be utilized to retract or extend the blade tensioning cable 444, adjusting the tautness of the blade tensioning cable 444. A tensioning member can release the blade tensioning cable 444 should the blade tensioning cable 444 be subjected to a force above a predetermined limit, thus avoiding any damage to the cable supported mast turbine assembly 400.

Alternately, the rigid turbine blade 432 can be rigidly affixed to the mast 420. The mast 420 can be pivotally attached to the central hub 412, including a drive mechanism for rotating the mast 420, thus adjusting the angle of incidence of the pliant turbine blade 430.

Figure 20:
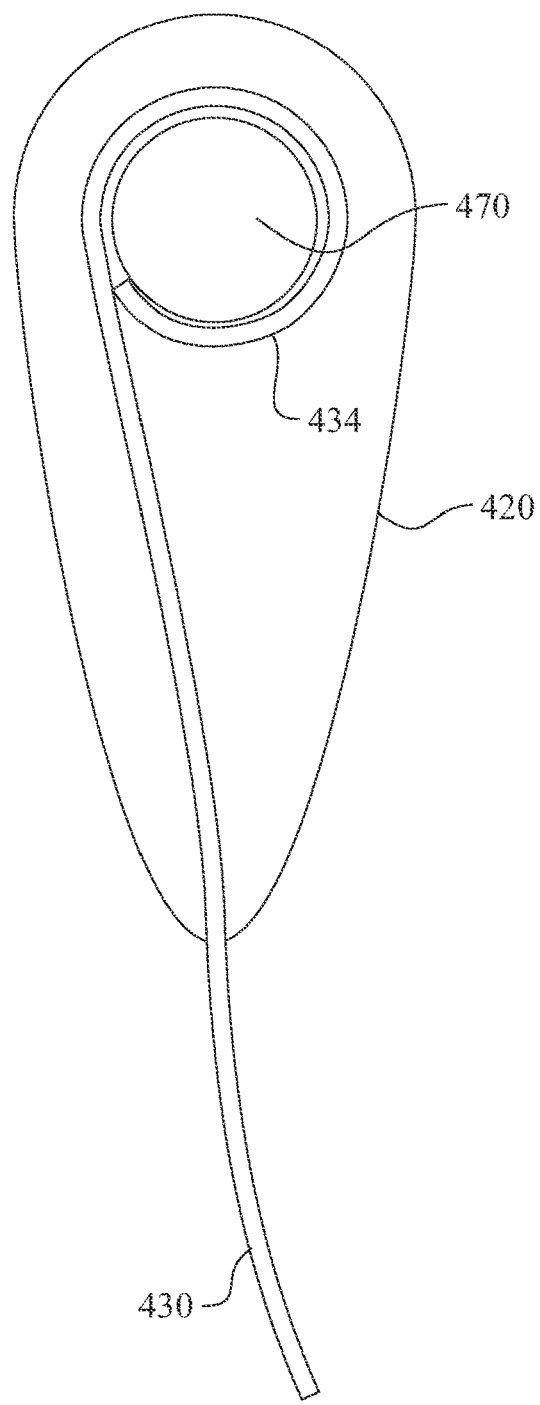
FIG. 20 presents a cross sectional view of the mast taken along section line 20-20 of FIG. 19, the illustration additionally introducing a blade retracting mechanism.

Any additional operational features of the turbine wheel assembly 100 can be applied to the cable supported mast turbine assembly 400. The mast 420 can include a hollow center, allowing the user to retract at least a portion of the pliant turbine blade 430 therein to reduce the exposed surface area thereof as illustrated in FIG. 20. A retracting mechanism 470 can be provided to gather the pliant turbine blade 430 within an interior section of the mast 420. One such means would be to rotate the retracting mechanism 470 collecting the pliant turbine blade 430, storing the excess material in a wrap referenced as a retracted turbine blade portion 434. The retracting mechanism 470 can be an elongated rotating structure such as an axle rotated by a motor or other rotational operating device.

The cable supported mast turbine assembly 400 is provided as a means for generating power. The cable supported mast turbine assembly 400 is designed whereby the central hub 412 is rotated by wind. The rotation of the central hub 412 is then converted into useable energy. A mechanical interface can engage with the central hub 412 to transfer mechanical power to drive a secondary apparatus. The mechanical interface can direct mechanical motion of a secondary apparatus. Alternately, an electricity generating apparatus 450 can engage with the central hub 412 to create electrical power. The electricity generating apparatus 450 can be located within an interior of the central hub 412 or external to the central hub 412. One portion of the electricity generating apparatus 450 remains stable and a second portion of the electricity generating apparatus 450 engages with the central hub 412 to rotate. The rotating motion drives the electricity generating apparatus 450 to create the electrical output. As illustrated on the right side of FIG. 19, the electricity generating apparatus 450 is secured to the hub support member 414. A generator interface 452 is attached to an axle of the electricity generating apparatus 450 and engages with an interior surface of the central hub 412. The central hub 412 rotationally drives the generator interface 452. The generator interface 452 rotates windings of a generator, which pass across fixed stators creating the electrical output. Conversely, as illustrated on the left side of FIG. 19, an electricity generating apparatus 460 can be secured to the interior surface of the central hub 412 via a generator mount 464. A generator interface 462 is attached to a fixed member, such as the hub support member 414. The motion of the central hub 412 causes the electricity generating apparatus 460 to rotate respective to the generator interface 462, thus generating the electrical output.

The turbine assemblies 100, 400 can be utilized for gas flow, such as gaseous flows, such as wind, or fluid flows, such as wave motion, currents, tidal flow, and the like. It is also understood that the turbine assembly 100, 400 can be attached to a moving object. The turbine assembly 100, 400 creates an output power based upon the relative motion between the turbine assembly 100, 400 and a fluid (either gaseous or liquid).

The previously described embodiments integrate the electric power generator 204, 450, 460 into the power generating central hub assembly 410 of the turbine assembly 200, 400. Electric power generators 204, 450, 460 are generally heavy, wherein the weight impacts the structural design and directional rotatability of the turbine assembly 200, 400.

Figure 21:
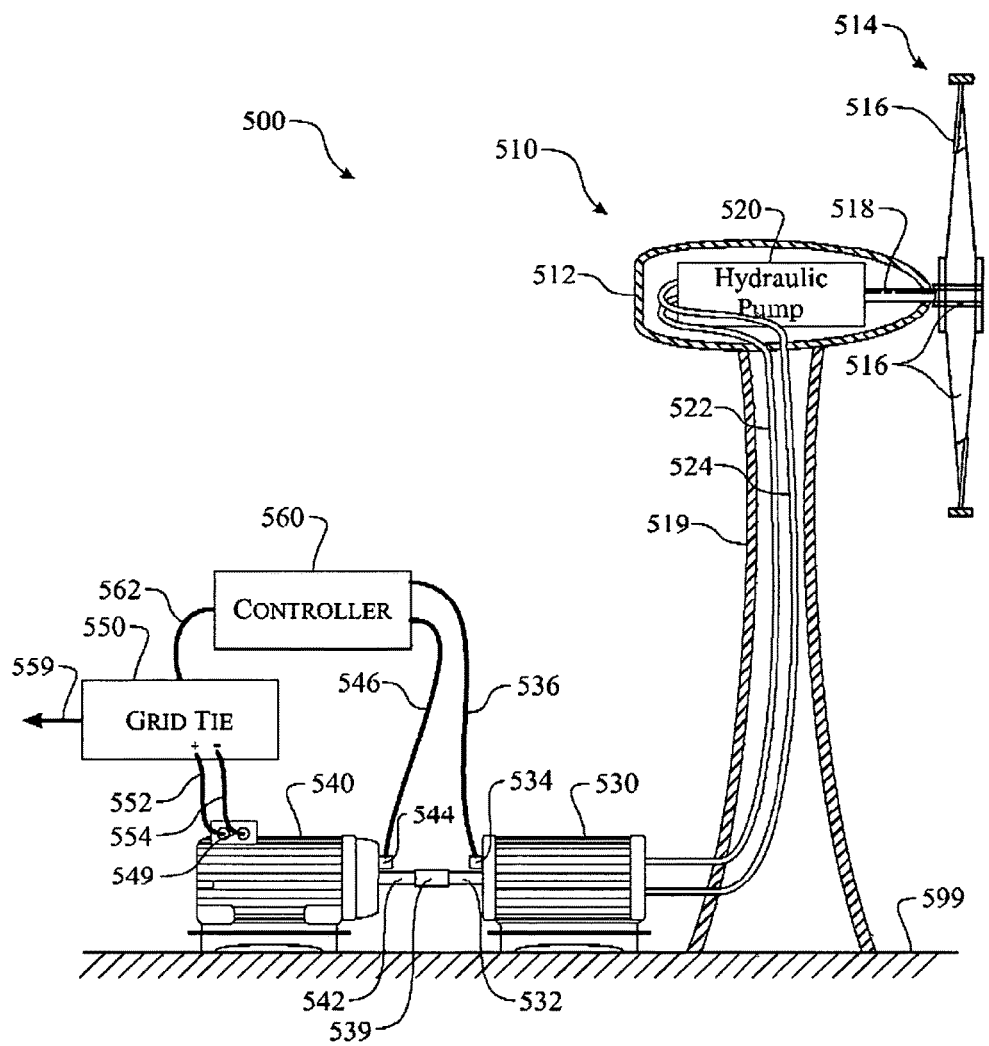
FIG. 21 presents a partially sectioned view of an exemplary wind operated electrical power generating system employing a hydraulic power transfer system and a power optimizing controller.

A wind operated electrical power generating system 500, as shown in an exemplary illustration presented in FIG. 21, introduces an alternative configuration for transferring wind energy to an electric generator 540. The wind operated electrical power generating system 500 employs a hydraulic system for transferring energy collected from wind to the electric generator 540. The wind operated electrical power generating system 500 includes a wind operated turbine assembly 510 for collecting energy from wind. The wind operated turbine assembly 510 includes a turbine housing 512 carried by a vertical riser support structure 519. The vertical riser support structure 519 is structurally supported by a system supporting surface 599. In a preferred configuration, the vertical riser support structure 519 is rigidly mounted to the system supporting surface 599. The system supporting surface 599 can be a cement slab; a natural earth surface, such as dirt, rocks, and the like; a wooden structure, a mobile vehicle, a floating vessel, and the like. The mounting configuration would be determined based upon the selected supporting material. The turbine housing 512 is preferably located atop a distal end of the vertical riser support structure 519. The turbine housing 512 includes various features required for operation of the wind operated turbine assembly 510. A turbine blade subassembly 514 is rotationally assembled to the turbine housing 512 using a turbine blade subassembly shaft 518. The turbine blade subassembly 514 can be of any suitable design, including a three blade 516 design as illustrated, the turbine wheel assembly 100, the crossover spoke turbine wheel assembly 300, the cable supported mast turbine assembly 400, and any other suitable wind power collecting design. The turbine housing 512 can be rigidly fixed to the vertical riser support structure 519 or rotationally carried by the vertical riser support structure 519. In a configuration where the turbine housing 512 is rotationally carried by the vertical riser support structure 519, the turbine housing 512 would rotate to optimize the directional relationship between the turbine blade subassembly 514 and the direction of the wind.

The hydraulic system includes a hydraulic pump 520 carried by the turbine housing 512, a hydraulic motor 530 distally located from the turbine housing 512 and preferably carried by the system supporting surface 599. A pair of hydraulic pipes, tubes or lines 522, 524 extends fluid communication between the hydraulic pump 520 and the hydraulic motor 530. The hydraulic lines 522, 524 can be routed within an interior of the vertical riser support structure 519, along an interior surface of the vertical riser support structure 519, along an exterior surface of the vertical riser support structure 519, or along any other supporting structure. The hydraulic lines 522, 524 can be fabricated of any suitable material. The hydraulic lines 522, 524 can be fabricated of a rigid material, such as PVC, copper, and the like, of a flexible material, such as plastic, nylon, rubber, and the like, or any combination thereof. The structure of the hydraulic lines 522, 524 can be rigid or include features to introduce flexure.

The hydraulic motor 530 is assembled in rotational communication with an electric generator 540. The hydraulic motor 530 includes a hydraulic motor shaft 532 that is rotationally driven by fluid flowing through the hydraulic lines 522, 524. The electric generator 540 includes an electric generator shaft 542, which is arranged in rotational communication with the hydraulic motor shaft 532 of the hydraulic motor 530. The hydraulic motor 530 and electric generator 540 are preferably rigidly mounted in a manner that provides and maintains dynamic alignment between the hydraulic motor shaft 532 and the electric generator shaft 542. In the exemplary embodiment, the hydraulic motor shaft 532 and the electric generator shaft 542 are coupled to one another using a shaft coupling 539. It is understood that the operational engagement can transfer a rotational force from the hydraulic motor shaft 532 to the electric generator shaft 542 using any suitable interface, including one or more gears, a clutch, a transmission, and the like.

A power control module 560 can be integrated into the wind operated electrical power generating system 500 to optimize power. The power control module 560 monitors the rotational speed of either shaft 532, 542. The wind operated electrical power generating system 500 can include at least one of a hydraulic motor shaft rotational speed sensor 534 and an electric generator shaft rotational speed sensor 544. The hydraulic motor shaft rotational speed sensor 534 would be arranged to monitor the rotational speed of the hydraulic motor shaft 532. A hydraulic motor shaft rotational speed sensor signal communication link 536 provides signal communication between the hydraulic motor shaft 532 and the power control module 560. The electric generator shaft rotational speed sensor 544 would be arranged to monitor the rotational speed of the electric generator shaft 542. An electric generator shaft rotational speed sensor signal communication link 546 provides signal communication between the electric generator shaft 542 and the power control module 560. The power control module 560 can operate using the hydraulic motor shaft rotational speed sensor 534, the electric generator shaft rotational speed sensor 544 or both. It is understood that the power control module 560 can include compensation information when gears, a transmission, or any other ratio translating interface is integrated between the hydraulic motor shaft 532 and the electric generator shaft 542.

The controller governs the power output from the electric generator 540 to a grid tie 550. The power control module 560 is in electric communication with the grid tie 550 using a power control module electrical communication link 562. Alternatively, the power control module 560 can be in electric communication with the electric generator 540 to accomplish the same end result using an alternate power control module electrical communication link 561.

Electrical power generated during operation of the electric generator 540 is transferred from the electric generator 540 through an electric output panel 549. In the exemplary embodiment, a pair of electrical output cables (a positive electrical output cable 552 and a negative electrical output cable 554) is used to provide electric communication between the electric generator 540 and the grid tie 550. The grid tie 550 provides electrical communication between at least one of the controller 560 and the generator 540 and an electric power grid 559. The generated electric power is transferred to a power grid 559 for use.

In operation, rotation of the turbine blade subassembly 514 is transferred to the hydraulic pump 520 by the turbine blade subassembly shaft 518. The rotational input to the hydraulic pump 520 generates a hydraulic fluid flowing down the first hydraulic line 522 and returning through the second hydraulic line 524. The hydraulic fluid flows through the hydraulic motor 530 causing the hydraulic motor 530 to rotate. The rotational motion of the hydraulic motor shaft 532 created by the hydraulic fluid flow drives a rotation of the electric generator shaft 542. The rotational motion of the electric generator shaft 542 powers the electric generator 540 to generate electric power. The electric power is fed to the electric output panel 549, which distributes the generated electric power through any number of electrical output cables 552, 554. It is understood that a grounding connection can be provided through a casing, frame, or other electrically conductive component of the electric generator 540.

Figure 22:
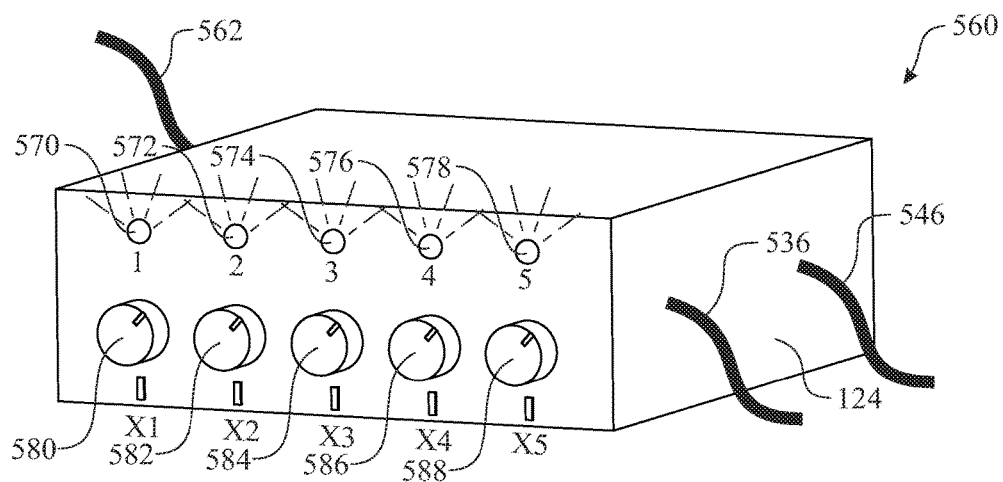
FIG. 22 presents an enlarged view of the power optimizing controller introduced in FIG. 21.

The power control module 560 is integrated into the wind operated electrical power generating system 500 to optimize or maximize electric output. Details of the power control module 560 are provided in FIG. 22. Integration of the power control module 560 is illustrated in an exemplary schematic diagram shown in FIG. 23.

The power control module 560 includes a circuit that monitors the rotational speed of either or both of the hydraulic motor shaft 532 and electric generator shaft 542 using the hydraulic motor shaft rotational speed sensor 534 and/or the electric generator shaft rotational speed sensor 544. The circuit includes a microprocessor, a digital memory device, at least one rotational speed indicator and at least one potentiometer (variable resistor) 580, 582, 584, 586, 588, wherein each of the at least one potentiometer (variable resistor) 580, 582, 584, 586, 588 is associated with a respective rotational speed indicator 570, 572, 574, 576, 578 of the at least one rotational speed indicator 570, 572, 574, 576, 578. The rotational speed indicator can be any suitable alert, including an audible alert, a visual alert, a transmitted message, a tactile alert, and the like, and any combination thereof. The audible alert can be a continuous audible signal, a cyclical or pulsed audible signal, a siren, and the like. The visual alert can be a continuously illuminated light, a flashing light, a light changing colors, and the like. The light can be a Light Emitting Diode (LED), an incandescent bulb, a fluorescent bulb, and the like. A transmitted message can be a text message, an email, a broadcast message, an audible or recorded message, an audible message transmitted to a cellular phone, and the like.

Each employed rotational speed sensor 534, 544 is in signal communication with the microprocessor by any suitable communication element, including hardwired, wireless, magnetic communication, and the like, and any combination thereof. As the rotational speed of the shafts 532, 542 approach a predetermined rotational speed, the associated rotational speed indicator 570, 572, 574, 576, 578 changes state to alert an individual monitoring the system. The individual monitoring the system would subsequently adjust the associated potentiometer (variable resistor) 580, 582, 584, 586, 588 to optimize the electric power output. Each of the rotational speed indicators 570, 572, 574, 576, 578 is associated with a specific predetermined rotational speed. It is understood that the predetermined rotational speed can be programmable, adjustable, or automatically determined by an algorithm programmed into the microprocessor/memory. The change in resistance is conveyed through the power control module electrical communication link 562. It is understood that any suitable circuitry can be employed to introduce the variable resistance from the associated potentiometer (variable resistor) 580, 582, 584, 586, 588 into the electric circuit of the electric generator 540 and/or the grid tie 550, such as integration of a transformer 590. Although the exemplary power control module 560 presents a manual implementation, it is understood that the process can be automated.

Figure 23:
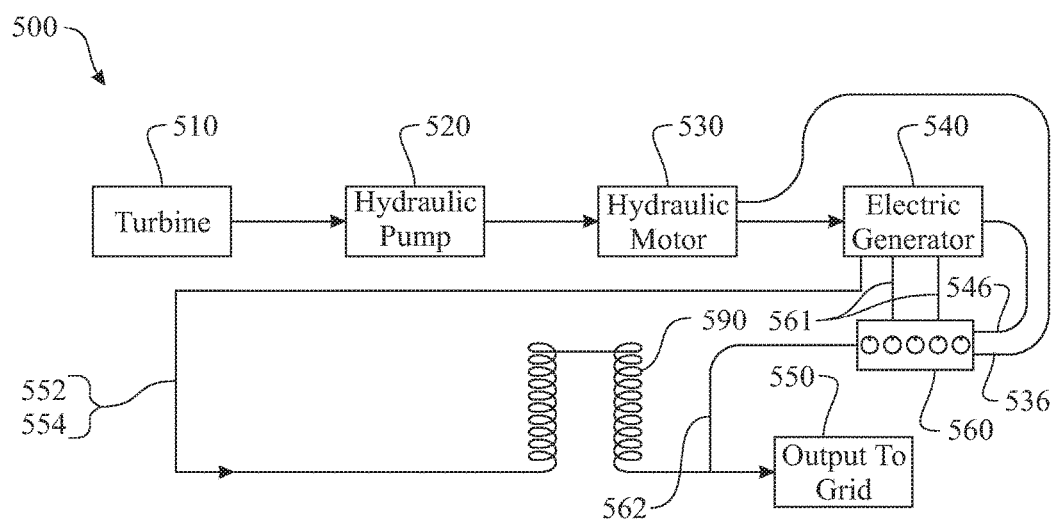
FIG. 23 presents an exemplary schematic diagram illustrating operational interactions between various components of the exemplary wind operated electrical power generating system introduced in FIG. 21.

The exemplary schematic diagram shown in FIG. 23 additionally illustrates the interaction between each of the primary components, as previously described herein.

Figure 24:
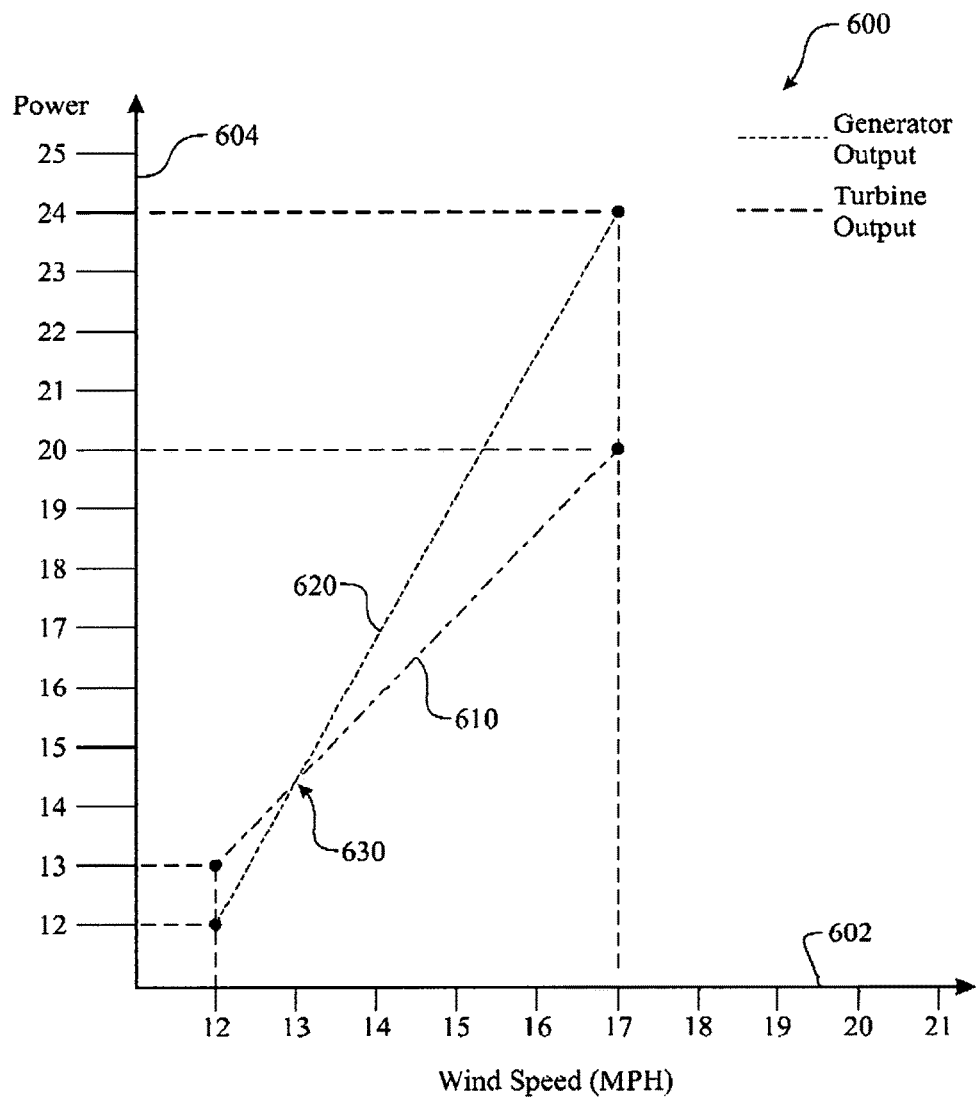
FIG. 24 presents an exemplary power output chart illustrating a power output to rotational speed relationship.

An exemplary power output chart 600 is presented in FIG. 24. The power output chart 600 plots a power output based upon a rotational speed of each of a generator (illustrated as a turbine theoretical output power curve 610) and a wind turbine (illustrated as a generator theoretical output power curve 620). The rotational speed of the associated element is referenced along a rotational speed axis 602. The output power of the associated element is referenced along a power output axis 604. The power output of the generator increases at a greater rate compared to the output of the turbine. The speed in which the generator theoretical output power curve 620 crosses over the turbine theoretical output power curve 610 defines a stall point 630. It is desired to optimize the electric power output by the generator, wherein the electric power output by the generator remains slightly below the power output by the turbine.

Figure 25:
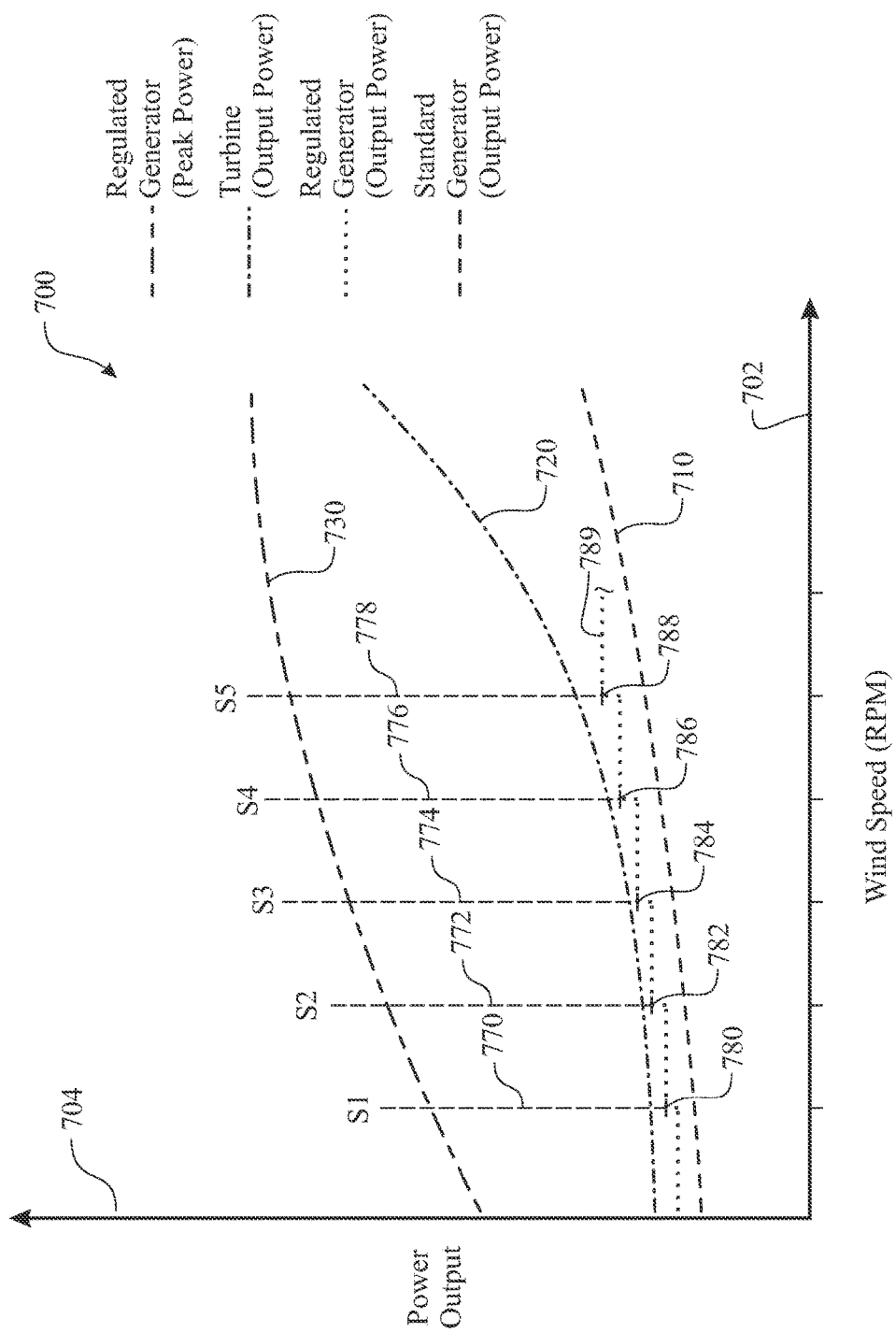
FIG. 25 presents an exemplary power output chart illustrating benefits of the power optimizing controller introduced in FIG. 21.

An exemplary power output chart 700 is presented in FIG. 25 by plotting a power output (that is associated with a wind speed. The wind or associated rotational speed is referenced along a wind speed generated RPM axis 702. The output power of the associated element is referenced along a power output axis 704.

The current technology employs a generator that has a lower output than the power captured by the wind operated turbine assembly 510. The infrastructure is configured in this manner to avoid overpowering the turbine, where a larger or excessive generator would overdrive the turbine. Alternatively stated, if the power extracted from the wind operated turbine assembly 510 is greater than the 100% of the power allowed by the wind operated turbine assembly 510, the wind operated turbine assembly 510 stalls. Therefore, it had been established that the generators should remain below the stall point of the associated turbine 510. This principle was understood to be a fundamental requirement, thus limiting the power output to the maximum capabilities of the currently utilized generators. An exemplary input, or power captured by the wind operated turbine assembly 510, is represented by a turbine power curve 720. The associated power output using currently deployed generators is represented by a current generator curve 710. The vertical gap between the turbine power curve 720 and the current generator curve 710 depicts losses.

Conversely, implementation of a larger generator in conjunction with the power control module 560 enables optimization of the power output while avoiding overpowering or governing the wind operated turbine assembly 510. The associated power output using a regulated generator is represented by a regulated generator curve 730, wherein the regulated generator creates excessive power or power greater than the power obtained by the turbine 510. Power optimization is accomplished by introducing a variable resistance into the electric network. The process is further optimized by monitoring for predetermined rotational speeds 770, 772, 774, 777, 778 of the electric generator 540 (or calibrated to determine an associated rotational speed) and adjusting the resistance accordingly by adjusting an associated potentiometer (variable resistor) 580, 582, 584, 586, 588. The goal is to maintain or govern a power output, identified as an adjusted power output 780, 782, 784, 786, 788 at a level slightly less than the power obtained by the wind operated turbine assembly 510. The power output chart 700 illustrates the small gap between each adjusted power output point 780, 782, 784, 786, 788 and the associated curve of the turbine power curve 720. The power output remains constant, independent of the speed of rotation of the turbine blade assembly 514, as illustrated by the regulated power output curve 789. The resulting regulated power output curve 789 has a step curve shape. The exemplary power output chart 700 illustrates the additional electric power output at each respective rotational speed 770, 772, 774, 777, 778 compared to the power output from the standard generator 710. The gap parallel to the power output axis 704 between each adjusted power output level 780, 782, 784, 786, 788 and the associated power output level of the standard generator 710 defines the increase in power output, based upon the same energy created by the wind operated turbine assembly 510. Those skilled in the art would understand that the number of predetermined rotational speeds 770, 772, 774, 777, 778 and the number of associated potentiometer (variable resistor) 580, 582, 584, 586, 588 can vary based upon the characteristics and engineering of the system.

In operation, as the rotational speed approaches each predetermined rotational speed, the respective rotational speed indicator 570, 572, 574, 576, 578 converts to a notification state. The service person adjusts the associated potentiometer (variable resistor) 580, 582, 584, 586, 588 to optimize the power output to the desired level of slightly lower than the turbine power curve 720. The associated potentiometer (variable resistor) is in electrical communication 561 with the electric generator 560, providing a varied resistance or load to the electric generator 560. The increased load acts as a brake and decreases the rotational speed of the turbine blade subassembly 514. By varying the electric load, the rotational speed of the turbine blade subassembly 514 changes to optimize the power generated across many different bands of rotational speeds.

Although the exemplary embodiment integrates a controller 560 into a system employing a hydraulically driven system, it is understood that the power control module 560 can be integrated into any system employing a wind driven turbine used to power an electric generator.

Although the exemplary embodiments are directed towards a wind powered system, it is understood that the same power optimization system can be applied to a water driven turbine system.

Since many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalence.

What is claimed is:

1. A wind operated electrical power generating system, comprising:
a wind turbine comprising a turbine blade assembly attached to a turbine blade subassembly shaft, said turbine blade subassembly shaft being rotationally carried by a turbine housing, said turbine housing being supported by a vertical riser support structure, the turbine blade assembly comprising:
a hub having a hub radius defined from a hub center to an exterior edge of the hub,
a turbine outer rim having a rim radius defined from a rim center to an interior edge of the rim,
a plurality of spokes extending between the turbine outer rim and the hub,
each spoke having a radial free spanning dimension extending between an outer edge of the hub and an interior surface of the turbine outer rim; and
a plurality of turbine blades, each turbine blade having:
a leading edge assembled to a respective spoke,
a trailing edge assembled to a different respective spoke,
an outer edge located proximate the interior surface of the turbine outer rim,
an inner edge located between the outer edge and the interior surface of the turbine outer rim,
a turbine blade radial dimension extending in a radial direction between from the outer edge of each turbine blade and the inner edge of each turbine blade,
wherein the radial blade dimension is less than half of the radial free spanning dimension of the spoke,
wherein the turbine blade assembly is designed to rotate at a slow rotational speed;
a generator in one of direct and indirect operational communication with said turbine blade subassembly shaft, wherein rotation of said turbine blade subassembly shaft provides power to rotate an input shaft of said generator;
a rotational speed sensor arranged to sense a rotational speed of one of said turbine blade subassembly shaft and said generator shaft;
an electrical controller circuit in signal communication with said rotational speed sensor, wherein said electrical controller circuit identifies when a rotational speed of one of said turbine blade subassembly shaft and said generator shaft determined by a signal from said rotational speed sensor is a predetermined speed; and
at least one variable resistor, wherein said at least one variable resistor is placed in electric communication with the generator, wherein each said at least one variable resistor is adjusted to optimize an electrical power output, based upon and associated with a respective of said predetermined rotational speed of one of said turbine blade subassembly shaft and said generator shaft,
wherein a change in resistance by said at least one variable resistor changes a load upon said generator,
wherein said predetermined rotational speed of one of said turbine blade subassembly shaft and said generator shaft that is a stall speed of the turbine blade assembly,
wherein the load acts as a braking system, which adjusts a rotational speed of said generator shaft, which in turn adjusts the rotational speed of the turbine blade subassembly shaft wherein said at least one variable resistor are adjusted to a resistance that maintains a rotational speed of the turbine blade assembly to remain at or above a rotational speed that would cause stall of the turbine blades.

2. A wind operated electrical power generating system as recited in claim 1, further comprising:
a power control module, wherein said power control module contains said electrical controller circuit and said at least one variable resistor, wherein said at least one variable resistor is a manually adjusted.

3. A wind operated electrical power generating system as recited in claim 1, said electrical controller circuit further comprising at least one speed indicator, wherein each of said at least one speed indicator alerts a user when said electrical controller circuit identifies when a rotational speed determined by a signal from said rotational speed sensor is proximate a predetermined speed associated with each of said at least one speed indicator.

4. A wind operated electrical power generating system as recited in claim 1, said electrical controller circuit further comprising a plurality of speed indicators, wherein one of said plurality of speed indicators alerts a user when said electrical controller circuit identifies when a rotational speed determined by a signal from said rotational speed sensor is proximate a predetermined speed associated with said one of said plurality of speed indicators.

5. A wind operated electrical power generating system as recited in claim 1, said electrical controller circuit further comprising a plurality of speed indicators, wherein one of said plurality of speed indicators alerts a user when said electrical controller circuit identifies when a rotational speed determined by a signal from said rotational speed sensor is proximate a predetermined speed associated with said one of said plurality of speed indicators; and
said at least one variable resistor is a plurality of said variable resistors, wherein each variable resistor of said plurality of variable resistors is associated with a respective speed indicator of said plurality of speed indicators.

6. A wind operated electrical power generating system as recited in claim 1, further comprising:
a transformer integrated in electric communication between said at least one variable resistor and a grid tie.

7. A wind operated electrical power generating system as recited in claim 1, wherein said generator is capable of outputting a power level that is greater than a power level obtained by said wind turbine when said system is operating at an operational rotational speed.

8. A wind operated electrical power generating system as recited in claim 1, further comprising:
a hydraulic pump in operational communication with said turbine blade assembly; and
a hydraulic motor in fluid communication with said hydraulic pump and said hydraulic motor is in operational communication with said generator.

9. A wind operated electrical power generating system, comprising:
a wind turbine comprising a turbine blade assembly attached to a turbine blade subassembly shaft, said turbine blade subassembly shaft being rotationally carried by a turbine housing, said turbine housing being supported by a vertical riser support structure, the turbine blade assembly comprising:
a hub having a hub radius defined from a hub center to an exterior edge of the hub,
a turbine outer rim having a rim radius defined from a rim center to an interior edge of the rim, a plurality of spokes extending between the turbine outer rim and the hub,
each spoke having a radial free spanning dimension extending between an outer edge of the hub and an interior surface of the turbine outer rim; and
a plurality of turbine blades, each turbine blade having:
a leading edge assembled to a respective spoke,
a trailing edge assembled to a different respective spoke,
an outer edge located proximate the interior surface of the turbine outer rim, and
an inner edge located between the outer edge and the interior surface of the turbine outer rim,
a turbine blade radial dimension extending in a radial direction between from the outer edge of each turbine blade and the inner edge of each turbine blade,
wherein the radial blade dimension is less than half of the radial free spanning dimension of the spoke,
wherein the turbine blade assembly is designed to rotate at a slow rotational speed;
a generator in one of direct and indirect operational communication with said turbine blade subassembly shaft, wherein rotation of said turbine blade subassembly shaft provides power to rotate an input shaft of said generator, wherein said generator is capable of outputting a power level that is greater than a power level obtained by said wind turbine when said system is operating at an operational rotational speed;
a rotational speed sensor arranged to sense a rotational speed of one of said turbine blade subassembly shaft and said generator shaft;
an electrical controller circuit in signal communication with said rotational speed sensor, wherein said electrical controller circuit identifies when a rotational speed of one of said turbine blade subassembly shaft and said generator shaft determined by a signal from said rotational speed sensor is proximate a predetermined speed;
at least one variable resistor, wherein at least one variable resistor is placed in electric communication with the generator, wherein each said at least one variable resistor is adjusted to optimize an electrical power output, based upon and associated with a respective of said predetermined rotational speed of one of said turbine blade subassembly shaft and said generator shaft; and
a grid tie providing electrical communication between at least one of said controller and said generator and an electric power grid,
wherein said predetermined rotational speed of one of said turbine blade subassembly shaft and said generator shaft that is a stall speed of the turbine blade assembly,
wherein a change in resistance by said at least one variable resistor changes a load upon said generator,
wherein the load acts as a braking system, which adjusts a rotational speed of said generator shaft, which in turn adjusts the rotational speed of the turbine blade subassembly shaft wherein said at least one variable resistor are adjusted to a resistance that maintains a rotational speed of the turbine blade assembly to remain at or above a rotational speed that would cause stall of the turbine blades.

10. A wind operated electrical power generating system as recited in claim 9, further comprising:
a power control module, wherein said power control module contains said electrical controller circuit and said at least one variable resistor, wherein said at least one variable resistor is manually adjusted.

11. A wind operated electrical power generating system as recited in claim 9, said electrical controller circuit further comprising at least one speed indicator, wherein each of said at least one speed indicator alerts a user when said electrical controller circuit identifies when a rotational speed determined by a signal from said rotational speed sensor is proximate a predetermined speed associated with each of said at least one speed indicator.

12. A wind operated electrical power generating system as recited in claim 9, said electrical controller circuit further comprising a plurality of speed indicators, wherein one of said plurality of speed indicators alerts a user when said electrical controller circuit identifies when a rotational speed determined by a signal from said rotational speed sensor is proximate a predetermined speed associated with said one of said plurality of speed indicators.

13. A wind operated electrical power generating system as recited in claim 9, said electrical controller circuit further comprising a plurality of speed indicators, wherein one of said plurality of speed indicators alerts a user when said electrical controller circuit identifies when a rotational speed determined by a signal from said rotational speed sensor is proximate a predetermined speed associated with said one of said plurality of speed indicators; and
said at least one variable resistor is a plurality of said variable resistors, wherein each variable resistor of said plurality of variable resistors is associated with a respective speed indicator of said plurality of speed indicators.

14. A wind operated electrical power generating system as recited in claim 9, further comprising:
a transformer integrated in electric communication between said at least one variable resistor and said grid tie.

15. A wind operated electrical power generating system as recited in claim 9, further comprising:
a hydraulic pump in operational communication with said turbine blade assembly; and
a hydraulic motor in fluid communication with said hydraulic pump and said hydraulic motor is in operational communication with said generator.

16. A wind operated electrical power generating system, comprising:
a vertical riser support extending upward from a supporting surface;
a turbine housing carried by said vertical riser support;
a wind driven turbine blade subassembly in operational communication with a turbine shaft, the wind driven turbine blade subassembly comprising:
a hub having a hub radius defined from a hub center to an exterior edge of the hub,
a plurality of spokes extending between the turbine outer rim and the hub,
each spoke having a radial free spanning dimension extending between an outer edge of the hub and an interior surface of the turbine outer rim; and
a plurality of turbine blades, each turbine blade having:
a leading edge assembled to a respective spoke,
a trailing edge assembled to a different respective spoke,
an outer edge located proximate the interior surface of the turbine outer rim,
an inner edge located between the outer edge and the interior surface of the turbine outer rim, a turbine blade radial dimension extending in a radial direction between from the outer edge of each turbine blade and the inner edge of each turbine blade,
wherein the radial blade dimension is less than half of the radial free spanning dimension of the spoke,
wherein the turbine blade assembly is designed to rotate at a slow rotational speed;
a hydraulic pump carried by said turbine housing and in operational communication with said turbine shaft;
a hydraulic motor comprising a hydraulic motor drive shaft, wherein said hydraulic motor is distally located from said turbine housing and in hydraulic communication with said hydraulic pump through hydraulic lines;
an electrical power generator comprising a generator drive shaft in rotational communication with said hydraulic motor drive shaft,
a rotational speed sensor arranged to sense a rotational speed of said wind driven turbine blade subassembly;
an electrical controller circuit in signal communication with said rotational speed sensor, wherein said electrical controller circuit identifies when a rotational speed of one of said turbine blade subassembly shaft and said generator shaft determined by a signal from said rotational speed sensor is proximate a predetermined speed; and
a speed controller comprising at least one of:
a) at least one variable resistor, wherein said at least one variable resistor is placed in electric communication with the generator, wherein each said at least one variable resistor is adjusted to optimize an electrical power output, based upon and associated with a respective of said predetermined rotational speed of one of said turbine blade subassembly shaft and said generator shaft, and
b) a hydraulic system controller, wherein said hydraulic system controller is in communication with a proportioning valve, wherein said proportioning valve is adjusted to optimize an electrical power output, based upon and associated with said predetermined rotational speed of one of said turbine blade subassembly shaft and said generator shaft, the proportioning valve is integral within the hydraulic system at a location to regulate pressure to the hydraulic motor of-the hydraulic system, which in turn governs the rotational speed of the turbine blade subassembly shaft, wherein rotation of said wind driven turbine blade subassembly rotationally drives said hydraulic pump,
wherein said hydraulic pump flows hydraulic fluid through said hydraulic lines to said hydraulic motor,
wherein said hydraulic fluid flowing through said hydraulic lines drives rotation of said hydraulic motor;
wherein said hydraulic motor drives rotation of said electric power generator, which outputs electric power,
wherein said predetermined rotational speed of one of said turbine blade subassembly shaft and said generator shaft that is a stall speed of the turbine blade assembly,
wherein a change in resistance by said at least one variable resistor changes a load upon said generator,
wherein the load acts as a braking system, which adjusts a rotational speed of said generator shaft, which in turn adjusts the rotational speed of the turbine blade subassembly shaft wherein said at least one variable resistor are adjusted to a resistance that maintains a rotational speed of the turbine blade assembly to remain at or above a rotational speed that would cause stall of the turbine blades.

17. A wind operated electrical power generating system as recited in claim 16, further comprising a at least one variable resistor, wherein said at least one variable resistor increases a load upon said generator.

18. A wind operated electrical power generating system as recited in claim 16, further comprising an electric power output controller module, wherein said electric power output controller module increases a load upon said generator.

19. A wind operated electrical power generating system as recited in claim 16, further comprising an electric power output controller module, wherein said electric power output controller module varies a resistance of a current flow, optimizing power generation efficiency and electric power output.

20. A wind operated electrical power generating system as recited in claim 16, further comprising an electric power output controller module, said electric power output controller module includes:
a rotational speed monitoring system, and
a load generating circuit;
wherein said load generating circuit increases a load upon said generator when said rotational speed monitoring system identifies a condition where a rotational speed of at least one of said generator and said turbine shaft is proximate a predetermined rotational speed.

\* \* \* \* \*